(12) United States Patent
Nelson et al.

(10) Patent No.: US 11,420,125 B2
(45) Date of Patent: Aug. 23, 2022

(54) CLUSTERING AUDIENCE BASED ON EXPRESSIONS CAPTURED FROM DIFFERENT SPECTATORS OF THE AUDIENCE

(71) Applicant: Sony Interactive Entertainment Inc., Tokyo (JP)

(72) Inventors: David Nelson, San Mateo, CA (US); Sudha Krishnamurthy, San Mateo, CA (US); Mahdi Azmandian, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/220,709

(22) Filed: Apr. 1, 2021

(65) Prior Publication Data

US 2022/0168644 A1 Jun. 2, 2022

Related U.S. Application Data

(60) Provisional application No. 63/133,129, filed on Dec. 31, 2020, provisional application No. 63/133,115, filed on Dec. 31, 2020, provisional application No. 63/119,637, filed on Nov. 30, 2020.

(51) Int. Cl.
*A63F 13/42* (2014.01)
*A63F 13/57* (2014.01)
*A63F 13/213* (2014.01)

(52) U.S. Cl.
CPC ............ *A63F 13/57* (2014.09); *A63F 13/213* (2014.09); *A63F 13/42* (2014.09)

(58) Field of Classification Search
CPC .......... A63F 13/57; A63F 13/42; A63F 13/213
See application file for complete search history.

(56) References Cited

U.S. PATENT DOCUMENTS

| | | | |
|---|---|---|---|
| 2003/0038805 A1* | 2/2003 | Wong | A63F 13/12 345/473 |
| 2003/0044021 A1* | 3/2003 | Wilkinson | G09B 19/0015 381/56 |
| 2008/0079752 A1* | 4/2008 | Gates | G06F 3/011 345/633 |

(Continued)

OTHER PUBLICATIONS

ISR & WO PCT/US2021/061040, dated Mar. 1, 2022, 3 pages.

*Primary Examiner* — David L Lewis
*Assistant Examiner* — Shauna-Kay Hall
(74) *Attorney, Agent, or Firm* — Penilla IP, APC

(57) ABSTRACT

Methods and systems for representing emotions of an audience of spectators viewing online gaming of a video game include capturing interaction data from spectators in an audience engaged in watching gameplay of the video game. The captured interaction data is aggregated by clustering the spectators into different groups in accordance to emotions detected from the spectators in the audience. An avatar is generated to represent emotion of each group and expressions of the avatar are dynamically adjusted to match changes in the expressions of the spectators of the respective group. The avatars representing distinct emotions of different group of spectators is presented alongside content of the video game. A size of the avatar for each distinct emotion is influenced by the confidence score associated with the respective group of spectators.

20 Claims, 18 Drawing Sheets

(56) References Cited

U.S. PATENT DOCUMENTS

| | | | |
|---|---|---|---|
| 2013/0123019 A1* | 5/2013 | Sullivan | A63F 13/424 |
| | | | 463/42 |
| 2017/0003740 A1 | 1/2017 | Verfaillie et al. | |
| 2017/0003784 A1* | 1/2017 | Garg | A63F 13/355 |
| 2017/0171614 A1* | 6/2017 | el Kaliouby | G16H 50/30 |
| 2018/0093185 A1* | 4/2018 | Black | G06K 9/00315 |
| 2018/0139257 A1* | 5/2018 | Ninoles | H04L 65/4092 |
| 2019/0270018 A1* | 9/2019 | Evans | A63F 13/86 |
| 2019/0341025 A1* | 11/2019 | Omote | G10L 25/30 |
| 2020/0171382 A1* | 6/2020 | Agoston | A63F 13/355 |
| 2020/0193667 A1* | 6/2020 | Chu | G06K 9/6269 |
| 2020/0359108 A1* | 11/2020 | Lee | H04H 60/65 |
| 2021/0113929 A1* | 4/2021 | Krishnamurthy | G06F 3/011 |

\* cited by examiner

CLUSTERING AUDIENCE BASED ON EXPRESSIONS CAPTURED FROM DIFFERENT SPECTATORS OF THE AUDIENCE

CLAIM OF PRIORITY

The present application claims priority to and the benefit of U.S. Provisional Application Ser. No. 63/119,637, filed on Nov. 30, 2020, entitled "CLUSTERING AUDIENCE BASED ON EXPRESSIONS CAPTURED FROM DIFFERENT SPECTATORS OF THE AUDIENCE," the disclosure of which is incorporated herein by reference in its entirety for all purposes. The present application claims priority to and the benefit of U.S. Provisional Application Ser. No. 63/133,115, filed on Dec. 31, 2020, entitled "REACTION TRACK FOR DIFFERENT SPECTATOR GROUPS WITHIN AN AUDIENCE," the disclosure of which is incorporated herein by reference in its entirety for all purposes. The present application claims priority to and the benefit of U.S. Provisional Application Ser. No. 63/133,129, filed on Dec. 31, 2020, entitled "IDENTIFYING GRAPHIC INTERCHANGE FORMATS FOR INCLUDING WITH CONTENT OF A VIDEO GAME," the disclosure of which is incorporated herein by reference in its entirety for all purposes.

BACKGROUND

1. Field of the Disclosure

The present disclosure relates generally to representing emotions of spectators of a video game, and more particularly to methods and systems for displaying expressive icons that mimic the emotions detected from different groups of spectators of a video game.

2. Description of the Related Art

The video game industry has seen many changes over the years. In particular, online gaming and live-streaming events such as E-sports have seen a tremendous growth in terms of the number of live events, viewership, and revenue. Consequently, as online gaming and live-streaming events continue to grow in popularity, the number of spectators accessing the online gaming (i.e., gameplay) for viewing continues to grow. Due to the distributed nature of the video game, the spectators are able to connect to the video game from the comfort of their own home or from anywhere and spectate the online gaming.

A growing trend in the video game industry is to improve and develop unique ways that will enhance the experience of spectators and others (e.g., players, commentators, etc.) viewing the online gaming content. For example, in order to provide a truly immersive game viewing experience, the spectators are provided with different tools (e.g., user interfaces, recording tools, etc.) to express their emotions and share with other spectators and/or players. For instance, a spectator viewing the online gaming content may be provided with interactive user interfaces with interactive tools, such as chat interface, video/audio content uploading tools, etc., to comment on the online gaming and to communicate with other users. These interactive tools allow the spectator to provide audio comments, video comments, textual comments, etc., share memes, graphic interchange format (GIF) images, etc.

Although the various tools provide the spectator with some level of involvement, the spectator is unable to truly gauge the various vibes expressed by different spectators and the number of spectators that express each vibe. With reference to E-Sports where the sheer volume of spectators accessing and viewing the gameplay of the online game may run in the thousands or even millions, (depending on the popularity of the video game, players, video game, etc.), the number of comments shared by the spectators can also run in the thousands or millions. In order for the spectator to get a feel for the various vibes detected from different spectators in the audience watching the video game, the spectator will have to analyze each and every comment provided by the different spectators of the audience. Analyzing each and every comment can be overwhelming due to the sheer volume, especially when comments are being generated in real-time during live streaming of the video game. For a spectator, associating themselves with like-minded spectators would make them enjoy the online gaming (i.e., gameplay) as though they are hanging out with their friends and viewing the gameplay. The lack of visibility of the emotions of the other spectators watching the gameplay results in the spectator not being able to fully enjoy the gameplay of the video game.

It is in this context that implementations of the disclosure arise.

SUMMARY

Implementations of the present disclosure include methods and systems relating to aggregating the interactions of the spectators viewing the online gaming of the video game and rendering expressive avatars over an image representation of an audience of the video game, wherein the audience includes a plurality of spectators that have accessed the video game for watching gameplay. The various expressive avatars represent the emotions of the crowd of spectators that are part of the audience. The expressive avatars are identified by collecting the interaction data from the spectators as the spectators are watching the gameplay of the video game, in real-time. The interaction data collected from different spectators may include video of the spectators as they are watching the gameplay of the video game, the audio generated by the spectators, the text, Graphic Interchange Format images/files (GIFs), memes, emojis, etc., posted in a chat interface, social media interface, etc. The interaction data collected from different spectators are aggregated and sentiment analysis is performed on the aggregated data to identify salient emotions and ideas communicated by the spectators. As large number of spectators may be accessing the video game to view the gameplay, it is practically infeasible to process and express each individual spectator's emotions. Aggregating the interaction data allows consideration of each individual spectator's emotions in order to determine the different vibes expressed in the audience. The data from the sentiment analysis is used to determine the different vibes (i.e., emotions and reactions) expressed by the spectators in the audience.

The vibes detected from different spectators in the audience are sorted and spectators expressing the same or similar type of vibes are grouped together to define vibe cliques. The data related to the vibe cliques are used to generate expressive avatars, which are then forwarded to the client device of each spectator for rendering. The expressive avatar representing each vibe clique is configured to be overlaid over a corresponding section of an image representation of the audience rendered on client devices of the spectators. The avatars included in the image representation of the audience identify the different dominating vibes detected from the different spectators in the audience. A size of each expressive avatar is scaled to correspond with a size of the respective vibe clique. The larger the avatar of a particular vibe clique is, the more dominating the corresponding emotion (i.e., a level of dominance of the vibe detected from the respective avatars over other vibes) associated with the avatar is over the other emotions identified in the audience.

The interactions provided by the spectators may be in response to various activities occurring in the gameplay of the video game or in response to other spectators comment/interactions. The interactions may be in the form of audio comments, text comments, or chat comments provided via chat interface. Additionally or alternately, the interactions of the spectators may be in video format. For instance, spectators' expressions to the activities occurring within the video game or to interactions of other spectators may be captured using one or more cameras that are integrated within or are communicatively coupled to the client devices of the spectators and forwarded to the game cloud server. The game cloud server processes the images capturing the expressions of the spectators to determine the emotions expressed by the spectators.

The various interactions of the spectators are aggregated and a sentiment analysis is performed on the interaction data to identify salient emotions and ideas communicated by spectators. A word cloud is generated and dynamically updated with keywords identified from textual and audio content included in the interaction data, wherein the keywords that are updated to the word cloud capture the salient emotions and ideas expressing the emotional state of the audience. Machine learning algorithm is used to identify the keywords that express the salient emotions and ideas of spectators included in the interaction data as well as to analyze the facial features from the images of spectators captured in the video content. The machine learning algorithm is used to identify the various modal data streams included in the interaction data. The identified modal data streams are then processed using unimodal or multimodal approach to identify the emotions and reactions of the spectators. Various vibe cliques are identified by clustering the spectators expressing similar vibes (i.e., emotions) identified from the keywords. The clustering of the spectators may be further refined or conditioned based on the age, demographics, and other user attributes of the spectators. The user attributes may be obtained from the user profile maintained at the game cloud system.

Expressive avatars representing the different vibes (i.e., emotions) are generated for the different vibe cliques. The avatars are generated to include different characteristics to provide visual representation of the dominance of each emotion in the audience (i.e., crowd). Some characteristics include size to define the level of dominance of each emotion amongst the audience of spectators, color to reflect the spectators emotions, such as temperature and intensity of hue to invoke group psychology. The color for representing the different emotions may be selected by referring to brand color psychology publications/literature available to the system when generating the avatars. One example reference can be found at https://en.wikipedia.org/wiki/Color_psychology. Using machine learning, the emotions of a large number of spectators are recognized, aggregated and represented in a scalable manner to provide the spectator with a visual representation of the different emotions of the audience and the number of spectators in the audience expressing the different emotions. The avatars expressing the various emotions are provided for rendering over an image representation of the audience of spectators provided alongside the content of the video game from the online gaming session. One advantage is that the avatars provide a way for the spectators to visually gauge the distribution of reactions of the massively large group of gaming spectators quickly (i.e., almost in real-time) and allow a gaming spectator to compare how the spectator's own reaction compares with a peer group of spectators. Another advantage is that the spectator can quickly identify and associate themselves with like-minded spectators in order to fully enjoy the gameplay of the video game from any location. Yet another advantage is that the avatars allow a player of the online video game to gauge feedback to specific gameplays.

In one embodiment, a method for representing emotions of an audience of spectators viewing online gaming of a video game is provided. The method includes capturing interaction data from spectators in an audience engaged in watching gameplay of the video game. The interaction data captured from the spectators is aggregated. The aggregation includes clustering the spectators into different groups in accordance to emotions detected from the spectators in the audience. Each group of spectators is associated with a distinct emotion and a confidence score that corresponds to a number of spectators in the respective group expressing the distinct emotion. An avatar is generated to represent emotion of each group, wherein the avatar of each group provides a visual representation of the reactions of the respective group of spectators. Expressions of the avatar associated with each group are dynamically adjusted to match changes in the expressions of the spectators of the respective group. The avatars representing distinct emotions of different group of spectators in the audience are presented alongside content of the video game.

In one implementation, one or more modal data streams included in the interaction data are identified. The one or more modal data streams are processed to identify emotions expressed by the spectators viewing the video game. The spectators are clustered into groups in accordance to the emotions expressed by the spectators, such that each group of spectators is associated with a distinct emotion. The one or more modal data streams identified from interaction data correspond to any one or combination of text data, or video data, or audio data, or chat data, or emojis, or memes, or graphic content, or graphic interchange format files, collected in real time from the spectators viewing the gameplay of the video game. The video data captures expressions of the different spectators while the spectators are viewing the video game, and the audio data includes audio content as well as one or more audio features, such as pitch, or amplitude, or duration.

In one implementation, a plurality of models is generated and trained using machine learning algorithm. Each model of the plurality of models is trained using data from a specific one of the modal data streams identified from the interaction data. Outputs of the plurality of models are aggregated to classify the emotions of the spectators and to determine probability of each emotion expressed by the spectators via the interaction data.

In one implementation, a model is generated and trained using machine learning algorithm. The model is trained using the modal data streams identified from the interaction data as inputs. Outputs of the model are used to classify the emotions of the spectators and to determine probability of each emotion expressed by the spectators via the interaction data.

In one implementation, a size of the avatar for each distinct emotion is scaled based on the confidence score associated with the respective group of spectators.

In one implementation, the confidence score associated with each group of spectators varies in accordance to changes in number of spectators detected in the respective group of spectators.

In some implementations, aggregating the interaction data includes generating and dynamically updating a word cloud with keywords identified via sentiment analysis of the interaction data. The keywords are updated to the word cloud to capture an emotional state of the audience at each point in time. The keywords from the word cloud are used as inputs by machine learning algorithm to generate and train one or more models. Outputs from the one or more models are used to identify the emotions and probability of each emotion expressed by the spectators via the interaction data.

In one implementation, the interaction data includes one or more of video data, audio data, text comments or emoji reactions provided via an interactive interface. The interaction data is generated by or captured in real-time as the spectators are watching the video game.

In one implementation, the expressions of the spectators in each group change in accordance with changes occurring in the gameplay of the video game and the expressions of each avatar associated with the respective group are dynamically adjusted to reflect the changes detected in the expressions of the spectators of the respective group of spectators.

In one implementation, the confidence score associated with each group of spectators varies in accordance to changes in number of spectators detected in the respective group of spectators.

In one implementation, an interactive temporal graph is generated and presented to represent reaction intensities of different emotions detected from different groups of spectators in the video game. The reaction intensity of each of the different emotions in the interactive temporal graph varies over time in accordance to changes occurring in the gameplay of the video game. The changes in the reaction intensities captured in the interactive temporal graph are linked to particular portions of the gameplay of the video game that caused changes in the reaction intensities of the different emotions detected from the respective group of spectators. The linking allows access to the particular portions of the gameplay of the video game to view the interactions that caused corresponding changes in the reaction intensities.

In one implementation, the interactive temporal graph is a line graph and includes a plurality of graph lines with each graph line corresponding to a particular emotion detected from a specific group of spectators. The avatar corresponding to the particular emotion is rendered over the respective graph line.

In one implementation, the gameplay data of the video game is streamed in real-time and a recording of the gameplay is stored in a gameplay datastore and made available for subsequent streaming at delayed time. The delayed time, as used in this application, corresponds to rendering the recording of the gameplay when the video game is replayed at a later time instead of streaming in real-time. An interactive temporal graph representing reaction intensities of emotions associated with groups of spectators of the video game is generated and presented with the content of the video game. The interactive temporal graph is generated in real-time and is stored with the recording of the gameplay in the gameplay datastore. When the recording of the gameplay is streamed subsequently at delayed time, a new interactive temporal graph is generated by modifying the interactive temporal graph to include reaction intensities of the plurality of spectators captured when the recording of the gameplay is streamed during delayed time. The new interactive temporal graph capturing reaction intensities of the plurality of spectators is presented during rendition of the recording of the gameplay at the delayed time.

In one implementation, the presenting avatars include providing an user interface with a segmenting option and a formatting option for selection by spectators. The segmenting option provides options for selecting a segment from a plurality of segments defined on a display screen for rendering the avatars and the formatting option provides rendering option to adopt when rendering the avatar on the display screen. The formatting option includes one of a transparency format, or an overlay format or a presentation format.

In one implementation, the presenting of the avatar includes determining geo location of spectators in each group of spectators. When the spectators in each group are associated with a single geo location and each group of spectators is associated with distinctly different geo location, a map is presented identifying the geo locations associated with the different groups of spectators. The corresponding avatar associated with each respective group of spectators is overlaid at the geo location associated with the respective group of spectators identified in the map.

In one implementation, a specific one of the spectators in each group is identified, reactions of the specific spectator is captured during defining game moments of the video game, and the captured reactions of the specific spectator are rendered alongside the content of the video game.

In one implementation, the specific one of the spectator in each group is identified by identifying an action that is scheduled to occur in the video game based on game state of the game, identifying the types of reactions exhibited by different ones of spectators in each group for different actions occurring in the video game, and selecting the specific one of the spectators in each group based on the reactions exhibited by the specific spectator to the different actions, the selecting of the specific specitator includes predictively zooming in to capture the reactions of the specific spectator in each group when the action occurs in the video game.

In one implementation, the specific one of the spectators in each group is selected based on type and number of comments related to expressions of the specific spectator of each group generated by remaining spectator in the respective group, or randomly or is selected based on expressive reactions provided by the specific one of the spectators.

In one implementation, the interaction data captured from the spectators include reactions to an event or an action occurring in the video game, or counter-reactions to reactions of a particular spectator viewing gameplay of the video game.

In one implementation, the interaction data captured from the spectators of a group includes the reactions of the particular spectator associated with the group. The aggregation of the interaction data captured from the spectators includes aggregating reactions of other spectators in the group that are reacting to the reactions of the particular spectator.

In one implementation, clustering the spectators into different groups includes providing an option for a spectator to move from a first cluster to a second cluster. The option is provided on a user interface rendered alongside content of the video game. The move results in dynamically disassociating the spectator from the first cluster and dynamically associating the spectator to the second cluster. The dynamic associating allows the spectator to have access to the interactions of the spectators in the second cluster and the dynamic disassociating prevents the spectator from accessing the interactions of the spectators in the first cluster.

In an alternate implementation, a method for representing emotions of an audience of spectators viewing online gaming of a video game is provided. The method includes capturing interaction data from spectators in an audience engaged in watching gameplay of the video game. The interaction data captured from the spectators in the audience is aggregated and sentiment analysis of the interaction data is performed. The aggregating includes identifying one or more modal data streams included in the interaction data, processing the one or more modal data streams to identify emotions expressed by the spectators viewing gameplay of the video game, and clustering the spectators into groups in accordance to the emotions expressed by the spectators. Each group of spectators is associated with a distinct emotion and a confidence score that corresponds to a number of spectators in the respective group expressing the distinct emotion. An avatar is generated to represent the distinct emotion of each group. The expressions of the avatar associated with each group are dynamically adjusted to match changes in the expressions of the spectators of the respective group. The avatars representing the distinct emotions of different group of spectators is presented alongside content of the video game.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which.

DETAILED DESCRIPTION

Figure 1:
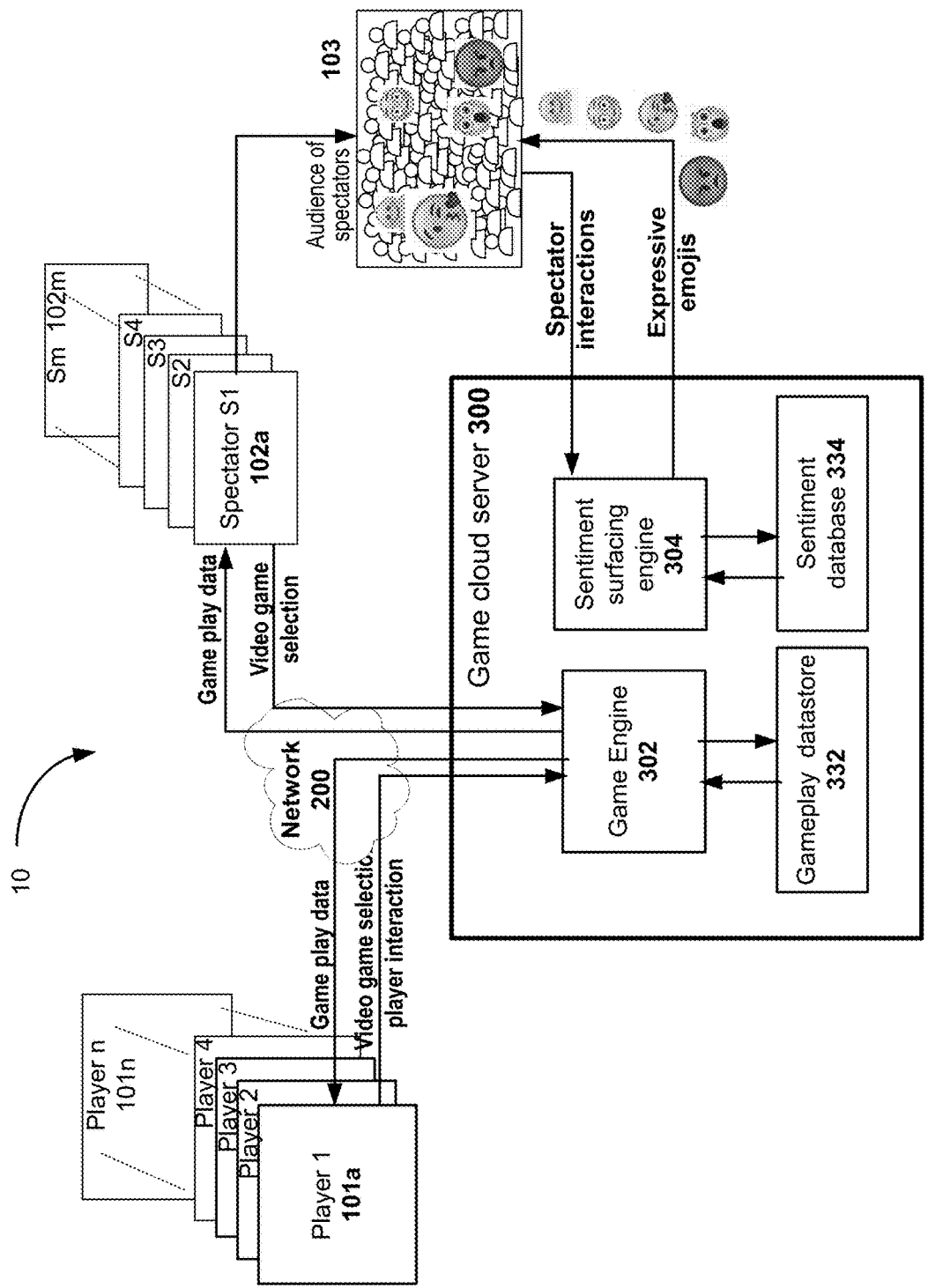
FIG. 1 illustrates a simplified block diagram of a system configured to execute a gameplay of a video game for a plurality of players and to identify and present emotions detected from different groups of spectators viewing gameplay of the video game, in accordance with an implementation of the disclosure.

The following implementations of the present disclosure describe methods and systems for generating and displaying expressive avatars of an audience of spectators viewing online gaming of a video game alongside content of the video game. The expressions of the avatars represent different emotions detected from spectators of the audience viewing the online gaming (i.e., gameplay) of the video game, enabling the spectators to gauge the distribution of different vibes of a massive group of spectators in the audience quickly. The avatars also allow each gaming spectator to identify a peer group that they can associate with by comparing their own reaction with the reactions of the different groups of spectators in the audience. The association allows the spectator to "hang out" with other spectators expressing similar emotions (i.e., vibes), making it feel that the spectator is hanging out with their friends or family that have come together in a living room or a common place or a stadium to watch the game. The disclosure allows the spectators to feel the emotions of the audience and associate with the spectators that feel the emotions that the spectator feels, thereby allowing the spectator to have a more enriching game viewing experience via digital spectating.

One of the main disadvantages of conventional digital spectating for a spectator is the lack of presence of other spectators to share the game viewing experience. The online video game (e.g., E-Sports) allows the spectators to view the online gaming (i.e., gameplay) of a video game from anywhere and be part of a spectating audience. The spectators connect to the online video game to spectate the gameplay, from their living room, dorm room, or any other favorite hangouts. However, for the spectator viewing the gameplay, the online spectating lacks the connection with other spectators that are usually present for live games played in stadiums, for example. This disadvantage can be overcome by inviting other spectators to a venue (e.g., sports bar) for watching the online gaming Bringing other spectators together requires planning, which is time consuming and requires the other spectators to be free for the time period, have the ability to travel to the venue, and be willing to travel to the venue. Even when the spectators congregate in a venue of choice, the spectators that are usually gathered in the venue may all be expressing the same emotions as that of the spectator that arranged the gathering. The spectators at the venue may not have the full visibility of the various emotions detected from the spectators in the audience as the spectators that have gathered in a stadium to watch a live game of a sport.

In order to mitigate the inconvenience and overcome the disadvantages of the conventional online spectating, the various embodiments described herein provide ways for visually presenting the emotions of different spectators viewing the online gaming of the video game. The emotions of massive audience of spectators, especially for E-sports that are very popular, are conveyed using expressive avatars. The avatars allow a first spectator to gauge the distribution of reactions of the massively large group of gaming spectators quickly (i.e., in almost real-time) and compare their reaction with that expressed by a peer group. The avatars also allows an online gamer (i.e., a player of the video game) to gauge feedback to specific gameplays. To provide the expressive avatars, a sentiment surfacing engine is engaged to perform the various steps. Some of the steps include information collection step or phase, information aggregation step or phase, and the illustration step or phase.

As used in this application, a spectator is an individual (i.e., a person or a user) who watches an online event, a show, a game, an activity, etc. An audience refers to a group or a collection of spectators that have assembled to watch the online event (either public or private event), such as a play, a movie, a concert, a meeting, a game, etc. In the various implementations discussed in this application, the spectator is part of an audience who has gathered to listen to and/or watch gameplay of a video game. The spectator could be engaged in listening to commentary of gameplay of the video game, or be engaged in watching gameplay of the video game, or engaged in both listening to and watching gameplay of the video game. Throughout this application, emotions and emotions are used interchangeably to refer to behavior of a person (e.g., spectator) that is communicated either through their interactions or through their expressions. The interactions are generally via speech (i.e., verbal) or writing (e.g., text or graphic content including text comments, graphic interchange format images/files, memes, emojis, graphic content, etc.). The expressions are generally provided using facial features.

In the information collection phase, live information from spectators is collected while the spectators are watching the gameplay of a video game. The live information may include live video of spectators as they are watching the game, live audio as they are communicating with the players and/or with other spectators, text or chat comments or emojis or memes or Graphic Interchange format images or files (GIFs) posted on an interactive interface, such as a chat interface, message board, etc. The information gathered from each spectator is based on the voluntary sharing opted by the respective spectator. For instance, each spectator may be provided with sharing options at a user interface presented alongside the content of the video game, wherein the sharing options identify specific ones of the interaction data generated by the spectator that the spectator is allowing the system to collect and use for determining emotions of the spectator. For instance, the spectator may generate audio data, text data, chat data, etc., and the spectator may generate reactions to events or actions occurring in the video game. The spectator may allow the system to collect only chat data or only text data or only audio data or only reactions or any combinations thereof. Alternately, the spectator may allow the system to collect any one or combination of the interaction data that the spectator generates or expresses for a specific portion of the video game or for specific session of the video game. The type and amount of live information collected from each spectator is based on the sharing option selected by the spectator.

The information collected in the information collection phase is aggregated and analyzed in real time. For instance, the live video feeds capturing faces of spectators are used to perform real-time emotion recognition. Machine learning algorithm may be used to identify the various modal data streams included in the live information and process the modal data streams to identify various emotions. For instance, the machine learning algorithm may be used to identify emotions expressed by the spectators from the facial features captured in the live feed. Similarly, audio and text comments undergo sentiment analysis to identify the salient emotions and ideas communicated by spectators. Memes, GIFs, and emojis are similarly analyzed using machine learning to identify the emotions expressed by the spectators. The results of the analysis of modal data streams, such as text data, audio data, chat data, etc., are used to create and update a dynamic word cloud with keywords that correspond to different emotions. The resulting word cloud captures the emotional state of the audience at different points of time. The machine learning algorithm is further engaged to cluster the spectators and identify the vibe cliques in the audience by identifying and grouping spectators that express similar vibes. The vibe cliques assist the players and spectators to feel the energy of the spectators of the audience and to relate to specific ones of the vibe cliques more strongly over other vibe cliques.

The results of the analysis are used to visualize the emotions of each vibe clique and to generate expressive avatars to represent the emotions of each vibe clique. Various characteristics of the avatar of each vibe clique are dynamically adjusted to change in color, size and expressions to reflect the current mood (i.e., emotion) of the respective vibe clique. In some implementation, expressions included in certain ones of the avatars are highlighted to provide reaction highlights. In alternate implementation, reactions of select one(s) of spectators in each vibe clique or from a specific vibe clique may be included as reaction highlights along with the expressive avatars of the different vibe cliques. The expressive avatars, and in some cases, the reaction highlights of select ones of the spectators are rendered alongside or overlaid over the content of the video game rendered at each client device of the spectators.

The sentiment surfacing engine is configured to represent wide variants of emotions (i.e., emotional states) experienced by the audience. The avatars are scaled to visualize a level of dominance the corresponding emotions have in the audience, with more dominant emotions rendered larger than less dominant emotions. The sentiment surfacing engine, using machine learning, is able to recognize the emotions of a large number of spectators distributed over a wide geography in a scalable manner and provide aggregate feedback to the spectators in substantial real-time.

With the above overview in mind, specific examples will be described with reference to several example figures to facilitate understanding of the example embodiments. It will be obvious, however, to one skilled in the art that the present disclosure may be practiced without some or all of the specific details presently described. In other instances, well known process operations have not been described in detail in order not to unnecessarily obscure the present disclosure.

FIG. 1 illustrates an embodiment of an overall game cloud system 10 configured to execute one or more instances of video game for gameplay by a plurality of players 101 and to process player interaction and spectator interactions generated during gameplay. The players 101a through 101n access instances of the game from a plurality of client devices. Selection of video game and request for gameplay of the video game are forwarded from the client devices of players 101 over a network 200 (such as Internet) to a game cloud server 300. A game engine 302 on the game cloud server 300 validates the players using user account information stored in a user account database (not shown) and, upon successful validation, instantiates one or more instances of the video game on one or more game cloud servers 300. The game engine 302 may be a distributed game engine that executes the video game on one or more game cloud servers 300 located within one or more data centers (not shown) located in one geo location or distributed across multiple geo locations. A plurality of spectators 102a-102m may access the video game executing on one or more game cloud servers 300 to view the online gaming of the video game. Access to the spectators 102a-102m may be restricted or open. If the access is restricted, the spectators 102a-102m are validated prior to providing the spectators 102a-102m access to the gameplay of the video game. The various instances of the game executing on different game cloud servers 300 in one or more data centers work together to provide wide access to players 101a-101n and the spectators 102a-102m in a distributed and seamless fashion.

The video game may be a multiplayer online game where the players 101a-101n may be individual players or may be part of different teams that are competing against one another. In some embodiments, the video game may include two teams that are opposing one another and the players 101a-101n may be part of one of two teams. In alternate embodiments, the video game may include more than two teams and the players 101a-101n may be part of any one of the plurality of teams. Player interactions in the video game are forwarded to the game engine 302 to affect game state of the game. In response to the player interactions, updated gameplay data is returned to the client devices of the players 101a-101n. The gameplay data is also maintained in a gameplay datastore 332 for later retrieval. It is to be noted that the gameplay data stored in the gameplay datastore 332 is from the live gameplay. The game engine encodes the gameplay data and forwards the gameplay data as encoded video streams to the client devices of the players 101a-101n. The client devices of the players 101a-101n are configured to receive the encoded video streams, decode the video streams and render frames of gameplay content on a display screen associated with the respective client devices. The display screen may be part of the client device (e.g., screen of a mobile device) or may be associated with the client device (e.g., monitor or television or other rendering surface). In some implementations, the client device of the players 101a-101n may be any connected device having a screen and internet connection.

In some implementations, during gameplay, the spectators 102a-102m may select the video game for viewing the gameplay of the video played by the players 101a-101n. Requests from the spectators 102a-102m are communicated via their respective client devices to the game cloud server 300 through the network 200. In response to the request from the spectators 102a-102m, the gameplay data depicting current game state of the video game is forwarded by the game server 300 (i.e., game cloud server 300) to the respective client devices of the spectators 102a-102m as encoded video streams. The client devices of the spectators 102a-102m receive the encoded video stream, decode the video stream and render the frames of gameplay data on display screen associated with the respective client devices. The client devices of the spectators 102a-102m may be any computing device, such as a head mounted display (HMD), mobile or portable computing device, desktop computing device, etc., and the display device may be a display screen associated with the HMD or other mobile/portable device (e.g., screen of a mobile phone, tablet computer, etc.,) or may be separate display devices or display surfaces, such as monitor, television, display screen, etc., communicatively connected to the client devices of the spectators 102a-102m. The spectators 102a-102m constitute an audience 103 that are viewing and/or listening to the gameplay of the video game played by the plurality of players 101a-101n.

The spectators 102a-102m may provide interactions related to the video game rendering on the client devices of the players 101a-101n and spectators 102a-102m. The interactions may be provided in the form of texts or emojis or memes or GIFs on a user interface, such as chat interface, message board, social media interface, etc., rendered alongside the content of the video game. The interactions may also be provided in the form of audio comments captured by a microphone or other audio capturing devices included in or associated with the client devices of the spectators 102a-102m. The interactions from the spectators 102a-102m may also be in the form of expressions of the spectators watching the gameplay captured as live video using one or more video cameras that are integrated within the client device of the spectators 102a-102m (e.g., head mounted displays, smart eye-glasses, mobile devices, etc.,) or from external cameras that are communicatively connected to the client devices of the spectators 102a-102m. The interactions of the spectators in the audience 103 are forwarded to the game cloud server 300.

An sentiment surfacing engine 304 collects the interactions of the spectators 102a-102m in the audience 103, analyzes the interactions to identify emotions expressed by the different spectators 102a-102m, group the spectators 102a-102m in the audience 103 in accordance to the expressed emotions, generate an avatar to represent each group of spectators, and adjust expressions of each generated avatar to match the emotions detected from the respective group of spectators. The expressive avatars, such as expressive emojis, are forwarded to the client devices of the spectators 102a-102m for overlaying over a representative image of the audience 103 of spectators 102a-102m rendered alongside content of the video game at the respective client devices of the spectators 102a-102m. The rendered expressive avatars provide the spectators with a visual representation of the different emotions detected from the spectators viewing the gameplay of the video game.

Figure 2:
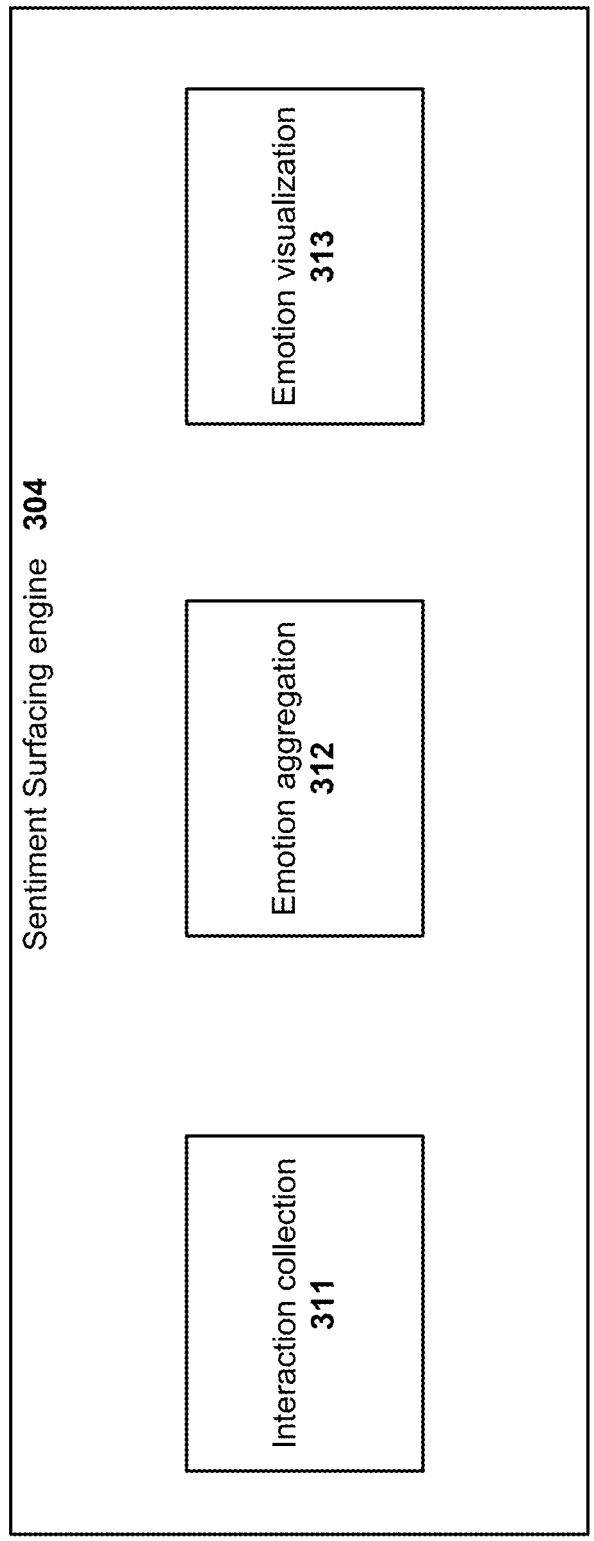
FIG. 2 illustrates a simplified overview of different phases of processing interaction data to identify and present emotions expressed by different spectators within an audience of spectators viewing gameplay of the video game, in accordance with an implementation of the disclosure.

FIG. 2 illustrates a broad overview of the various interaction processing phases of the sentiment surfacing engine 304 used for processing interactions and generating representative avatars for groups of spectators 102 that are part of an audience 103 watching gameplay of a video game, in accordance with one implementation. The sentiment surfacing engine 304 engages a machine learning algorithm to perform the various processing phases to identify emotions from interaction data of the spectators and illustrate the emotions in the form of avatars. The processing phases followed by the sentiment surfacing engine 304 may be broadly classified into three main phases. The three main phases include an interaction collection phase performed by an interaction collection engine 311, an emotion aggregation phase performed by an emotion aggregation engine 312 and an emotion visualization phase performed by an emotion visualization engine 313. The emotion aggregation phase encompasses emotion detection and spectator clustering in accordance to detected emotions.

Figure 3:
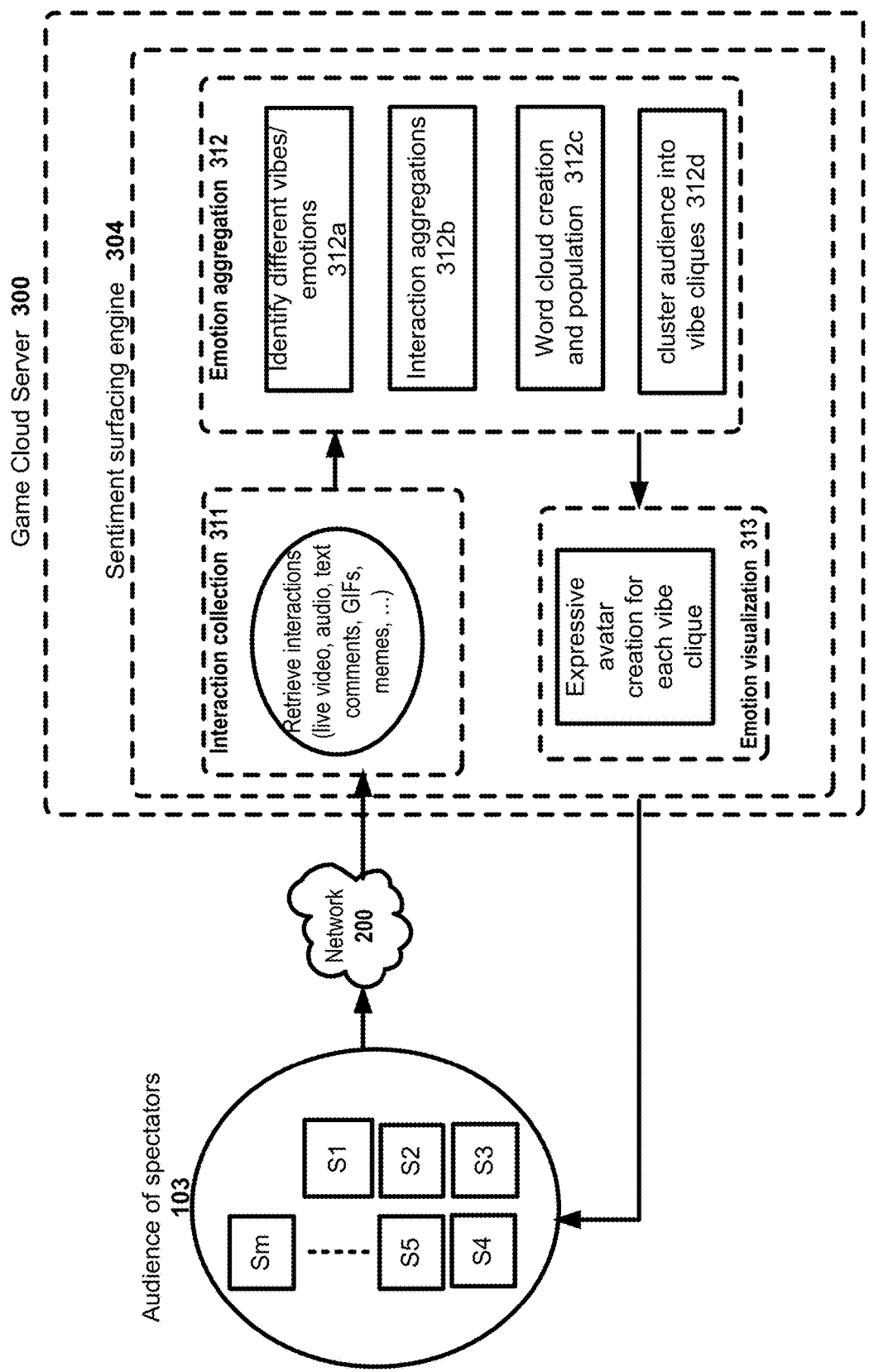
FIG. 3 illustrates a block diagram of a sentiment surfacing engine used to identify emotions detected from different spectators and present a visual representation of emotions detected from the different spectators, in accordance with an implementation of the disclosure.

FIG. 3 identifies sample set of operations performed in each phase by the sentiment surfacing engine 304, in one implementation. Referring simultaneously to FIGS. 2 and 3, the interactions of spectators 102 are captured at the respective client devices of the plurality of spectators 102 of the video game and forwarded as interaction data to the game cloud server 300 through the network 200. A sentiment surfacing engine 304 executing on the game cloud server 300 and operatively connected to the game engine collects the interaction data of the spectators, processes the interaction data, and generates the expressive avatars.

The sentiment surfacing engine 304 begins the processing of the interaction data collected from the spectators starting with the interaction collection phase. In the interaction collection phase, the interaction collection engine 311 collects the various interactions generated by the spectators 102 in real time while the spectators are watching the gameplay of the video game. The interactions may be in the form of reactions from the spectators in response to events or actions or activities occurring in the video game based on inputs provided by one or more players. Alternately, the reactions from the spectators may be in response to interactions provided by other spectators or players of the video game. The interactions are sorted based on the type. The different types of interactions that may be collected include live video capturing at least facial features of the spectators, audio content from the spectators' verbal interactions provided in response to actions/activities within the video game or as part of interactions with other spectators or players, text or graphical (e.g., memes, GIFs, emojis, etc.) content, etc. The sorted interactions are stored in sentiment database 334 and provided as input to the emotion aggregation engine 312 as part of the emotion aggregation phase.

The live video of a spectator may be captured using various image capturing devices, such as image sensors, video cameras, still cameras, stereo cameras, etc., integrated within or communicatively coupled to the client devices of the spectators. The live video of a spectator is used to identify the facial features from which potential expressions of the spectator may be deduced. Similarly, audio content may be captured using microphones or other audio capturing device of the client device or communicatively coupled to the client device of the spectators. The text or graphical content may be obtained from chat interface or message interface or social media interface rendered alongside the content of the video game. It should be understood that the interactions are collected from the spectators based on options selected by the spectators for sharing certain ones of the modal content generated while watching the gameplay of the video game, with the sentiment surfacing engine 304. For instance, a spectator may expressly select to share their chat content but not their video or audio content. As a result, in some implementations, a user interface (not shown) with selection options for sharing different modal content generated by the spectators may be provided for spectators' selection. The spectators may select to share none, one, some or all of the different modal content identified from interaction data by selecting the appropriate selection options. Based on the selection options selected by each spectator, the sentiment surfacing engine 304 gathers the corresponding modal data streams from the interaction data of the spectators for processing.

During the emotion aggregation phase the emotion aggregation engine 312 collects, in real time, the interactions of the spectators 102 while the spectators are watching the online gaming of the video game, and analyzes the interactions to recognize the emotions expressed by the spectators while watching the video game. The emotion aggregation engine 312 engages machine learning algorithm to identify the emotions (312a) detected from the interaction data collected from the spectators. The machine learning algorithm first determines the various modal data streams that are included in the interactions collected from the spectators. The machine learning algorithm then processes the modal data streams by either engaging unimodal or multimodal approach. For instance, the video feed of each spectator may be processed by the machine learning algorithm to identify facial features and perform real-time emotion recognition. Similarly, the audio content and text content may be processed by performing sentiment analysis to identify keywords that represent the salient emotions and ideas communicated by the spectators.

The machine learning algorithm then classifies the various emotions expressed by the spectators through interactions to identify the vibes. Emotions may be expressed by the spectators in varying degrees. For instance, spectators may express happy emotion in varying degrees including varying breadth of smile, using different keywords (e.g., happy, ecstatic, joy, pleased, awesome, etc.). The machine learning algorithm recognizes the varying degrees with which each emotion is expressed by the different spectators and classifies the various interactions accordingly into vibe buckets for each emotion. The varying degrees of emotion in each vibe bucket is then aggregated (312b). The machine learning algorithm engaged by the emotion aggregation engine 312 creates and updates (312c) a dynamic word cloud using the keywords identified from the sentiment analysis of the textual and verbal interactions. The dynamic word cloud, at any given point in time of the video game, provides a visual, textual representation of the emotional state of the audience. Other graphic content, such as graphic interchange format files/images (GIFs), memes, emojis, etc., included in the interaction data from the spectators are processed by the machine learning algorithm in a manner similar to the processing of the video feed to identify the emotions expressed by the spectators. The emotions identified from the keywords in the word cloud, from the videos of the spectators, and from the graphic content (e.g., memes, GIFs, emojis, other graphic content) are used by the machine learning algorithm to identify the vibes in the audience (step 312c) and to group (i.e., cluster) the spectators in the audience expressing similar vibes into vibe cliques (step 312d).

In one implementation, once the initial vibe cliques are formed, the spectators remain as members of the respective vibe cliques unless express request is received from the spectators to disassociate from the initial vibe clique. Consequently, when additional interactions are received from the spectators of a certain vibe clique, the additional interactions are processed by the different sub-components of the emotion aggregation engine 312 to identify additional emotions expressed by the spectators of the certain vibe clique. The additional emotions associated with the certain vibe clique are dynamically updated to reflect the current emotions of the group of spectators of the certain vibe clique. The additional interactions may be reactions in response to certain actions or activities occurring in the gameplay of the video game or may be reactions to certain interactions generated by players or spectators of the certain vibe clique or different vibe cliques. The grouping of the spectators with similar vibes allows the spectators in each group to associate with certain one of the players and align with other spectators expressing similar vibes. Similarly, the grouping allows the players to strongly jive with the energy of the associated group of spectators, which may be similar to having supporters for a live game played in a stadium. Data related to the vibe cliques are provided as input to the emotion visualization phase.

In the emotion visualization phase, an emotion visualization engine 313 generates an avatar for each vibe clique and adjusts the expressions of each of the avatars to reflect the emotions of each vibe clique. In addition to adjusting the expressions, the emotion visualization engine 313 adjusts one or more characteristics of the avatar, such as a size, color, etc., of the avatars to reflect the audience's moods, wherein a larger sized avatar is used to represent a more dominant emotion and the smaller sized avatar is used to represent a less dominant emotion expressed by the spectators in the audience. The adjusted avatars are returned to the respective client devices of the spectators 102 for rendering over an image representation of the audience 103 of spectators 102. The rendering of the expressive avatars provide the players 101 and the spectators 102 of the audience 103 a visual representation of a distribution of emotions in the audience 103. In some implementations, the avatars are in the form of emojis. Using machine learning, the sentiment surfacing engine 304 manages to recognize the emotions of a large number of spectators in a scalable manner and provides an aggregate feedback in real-time to allow the spectators in different groups to correctly gauge the emotions of the crowd of spectators 102.

Figure 4:
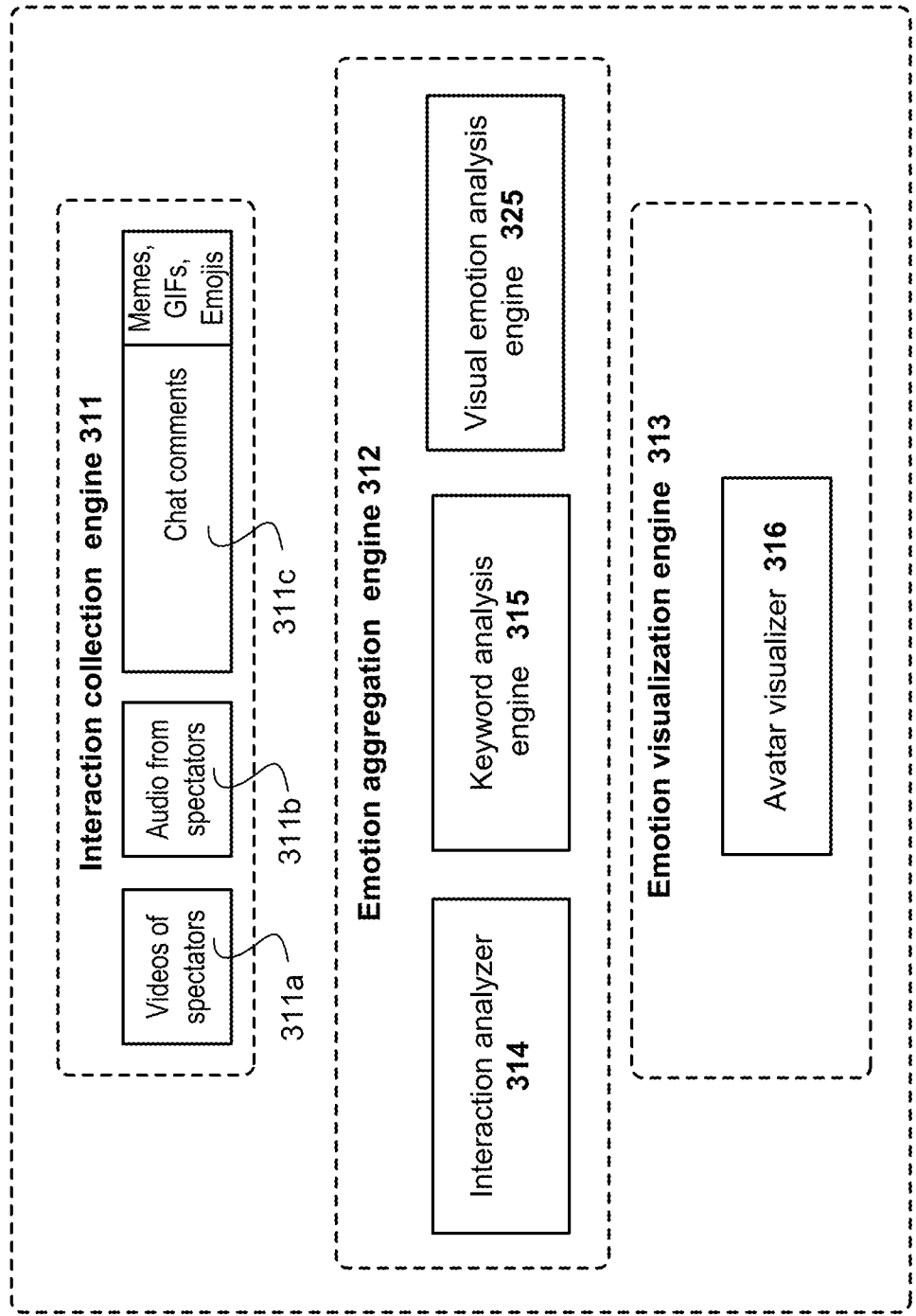
FIG. 4 illustrates a broad overview of the different components of the sentiment surfacing engine used during different phases of processing the interaction data to generate and present avatars representing the different emotions, in accordance with one implementation of the disclosure.

FIG. 4 illustrates some of the components of the sentiment surfacing engine 304, in one implementation. As mentioned previously with reference to FIGS. 2 and 3, the sentiment surfacing engine 304 includes an interaction collection engine 311, an emotion aggregation engine 312, and an emotion visualization engine 313. Some of the components may include additional sub-components. For example, the emotion aggregation engine 312 may include an interaction analyzer 314, a keyword analysis engine 315, and a visual emotion analysis engine 325. Similarly, the emotion visualization engine 313 may include an avatar visualizer 316.

The interaction collection engine 311 collects the interactions generated by the spectators 102 while the spectators are engaged in watching online gaming of the video game and processes them to identify the different modes (types) of interactions included therein. The different modes of interactions that may be identified by the interaction collection engine 311 can be broadly classified into live videos of spectators 311a that include both the audio and video component, audio of spectators 311b, and chat comments 311c. The live video of a spectator is captured using one or more image capturing devices as the spectator is watching the online gaming. The image capturing devices may include one or more of a video camera, a stereoscopic camera, a digital camera or any other image capturing device associated with or available at the client device of the spectators, wherein the client device may be portable computing device, such as a laptop computing device, a smart phone, a head mounted display, smart eyeglasses, a wearable computing device, a tablet computing device, etc., or a desktop computing device. The chat comments may include any and all types of content provided via a chat interface or message board or an interactive social media interface or any other interactive application interface. The chat comments may include text comments, videos or video clips, emojis, memes, audio clips, GIFs, etc., provided by spectators in response to events or activities or actions occurring during the gameplay of the video game or in response to interactions from other spectators or players.

The emotion aggregation engine 312 processes the interactions identified by the interaction collection engine 311 differently based on the modal type of interactions, in one implementation. For example, an interaction analyzer 314 within the emotion aggregation engine 312 is used to process the graphic content provided via chat interface to identify the emotions expressed via emojis, memes, GIFs and other graphic content. Probability score is computed for each of the emotions identified for the graphic content. The emotions and probability score for the graphic content is provided as input to the avatar visualizer 316.

The live video of the spectators may be partly processed by the interaction analyzer 314 and partly by a visual emotion analysis engine 325. For instance, the visual emotion analysis engine 325 is used to process images of spectators captured in the live video and the interaction analyzer 314 is used to process verbal content included in the live video. The visual emotion analysis engine 325 is used to analyze the facial features captured in the images to identify the emotions expressed by the spectators. The visual emotion analysis engine 325 may use machine learning algorithm to identify the attributes of the various facial features captured in the images and expression recognition neural network to identify the emotions expressed by the spectators. As the expressions provided by the spectators may correspond to more than one emotion (see FIG. 11), determining the most dominant emotion assists in clustering the spectators into appropriate vibe cliques. Consequently, the visual emotion analysis engine 325 computes a probability score (also referred to as "emotion probability score") 325a for each of the emotions identified from the attributes of the facial features. Based on the probability score 325a of each emotion identified from the expressions of the spectators, the most dominant emotion expressed by the spectator is identified. Upon identifying the emotions of each spectator, the spectators are clustered into vibe cliques, with each vibe clique corresponding to a distinct emotion. The details of spectators in each vibe clique and the emotions associated with each vibe clique are provided as input to the avatar visualizer 316.

The interaction analyzer 314 processes the audio content of the live video to identify keywords included therein. Similarly, text portion of the chat content is processed by the keyword analysis engine 315 to identify keywords and use the keywords to identify the emotions conveyed by the spectators via the text content. More details of the function of the interaction analyzer 314 will be described with reference to FIG. 5. Keywords identified from the analysis of the text and audio interactions are provided as input to a keyword analysis engine 315.

The keyword analysis engine 315 uses the keywords identified by the interaction analyzer 314 to populate a word cloud that is used to identify keywords that relate to emotions. The emotion related keywords in the word cloud are used to identify the different emotions expressed by the spectators in the audience. As more and more spectators begin to express certain ones of the emotions via interactions, the keyword analysis engine 315 computes a probability score for those emotions corresponding higher in the word cloud. The various keywords of the word cloud along with the computed probability scores for the corresponding emotions are provided as input to the emotion visualization engine 313. The emotions detected from the various interactions are used to cluster the spectators into vibe cliques, wherein each vibe clique corresponds to a distinct vibe or emotion. The clustering of the spectators may be further refined or conditioned based on the age, demographics, and other user attributes of the spectators. The user attributes may be obtained from the user profile maintained at the game cloud system. The vibe cliques identified for the different emotions are provided as inputs to the emotion visualization engine 313.

The emotion visualization engine 313 receives the various inputs from the emotion aggregation engine 312 and uses the input to create an avatar for each vibe clique. As part of creating the avatar to represent emotion of each vibe clique, the emotion visualization engine 313 computes a confidence score for each vibe clique as a number of spectators in the vibe clique that have expressed the dominant emotion or a comparable version of the dominant emotion. Based on the computed confidence score, an avatar visualizer 316 creates and adjusts avatars corresponding to the different vibe cliques identified in the audience. Adjusting the avatars includes adjusting at least the expressions, the size and the color of the avatars in accordance to the confidence score of the respective vibe cliques. The size of each avatar is scaled to correlate with the confidence score so that an avatar with the highest confidence score will be rendered larger than an avatar with the lower confidence score. Similarly, the colors of the avatars may be adjusted to reflect a vibe rating of the emotions that are being expressed. For example, an angry emotion may be rendered in red while a happy emotion may be rendered in green. More details of the vibe rating will be discussed with reference to FIG. 12. In some implementations, the avatar visualizer 316 may selectively identify certain ones of the emotions for generating expressive avatars that are returned to the client devices of the spectators for rendering over an image representation of the audience. For instance, the number of emotions identified by the emotion visualization engine 313 may be too many and rendering the avatars for all the emotions identified in the audience may make the rendering too crowded. So, to prevent such overcrowding of avatars while ensuring that the emotions of the spectators 102 in the audience 103 are appropriately represented, the avatar visualizer 316 may select a predefined number of emotions for representation using the avatars and generate the avatars accordingly. The emotions for representation may be selected based on their confidence score. For example, the maximum number of avatars for presenting over the audience may be predefined to be 5. As a result, when more than 5 emotions are identified from the spectators of the audience, the avatar visualizer 316 may select the top 5 emotions (i.e., dominant emotions) with the highest confidence score (i.e., with higher level of dominance) for generating the avatars.

The expressive avatars are returned to the client devices of the spectators 102 for rendering over an image representation of the audience 103 presented alongside content of the video game. The expressive avatars provide a visual representation of the emotions that are dominating in the audience 103. Based on the visual representation of emotions, the spectators may be able to identify a group of spectators whose emotions they most align with for hanging out, making it appear as though they are together in a stadium watching a live event (e.g., game).

Figure 5:
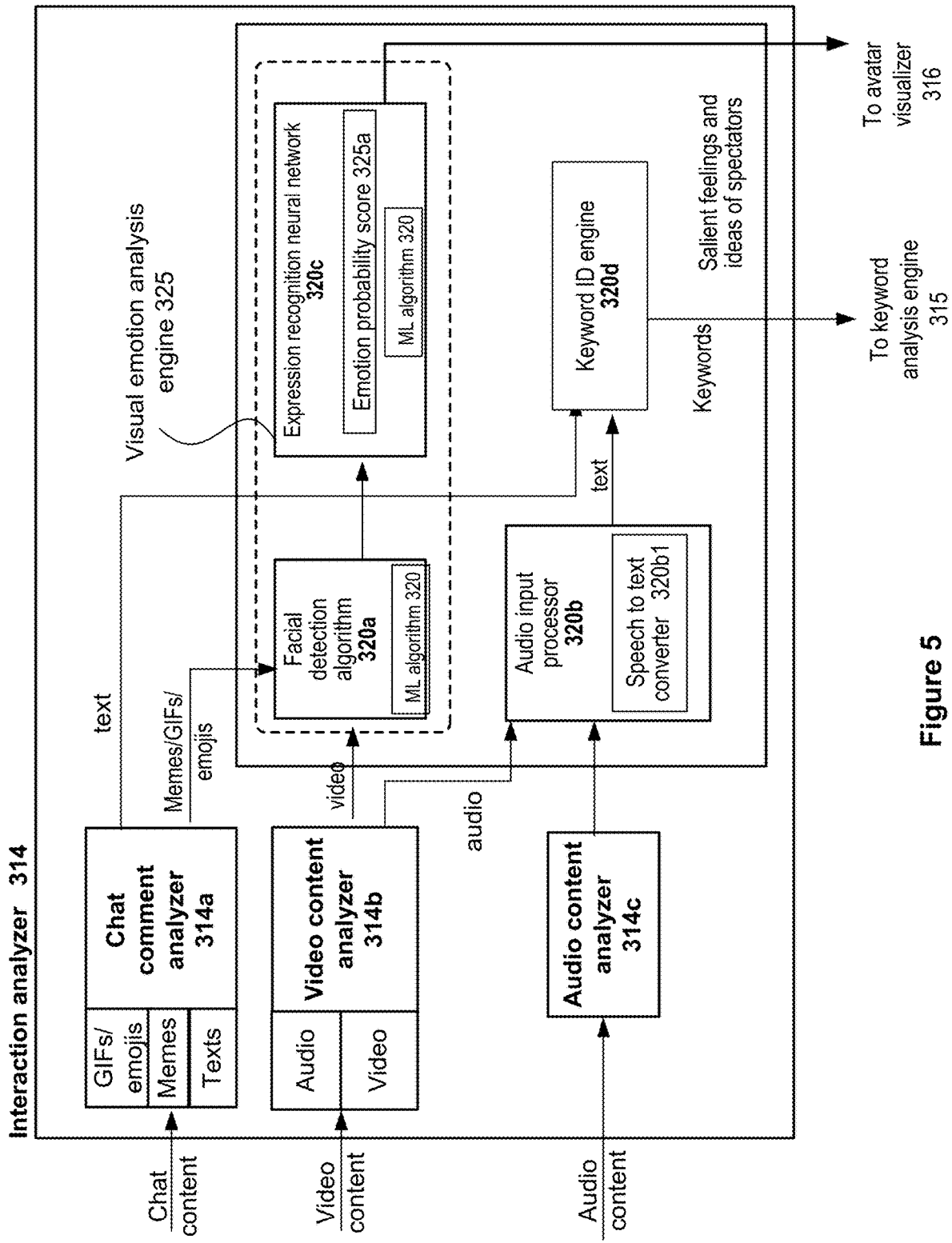
FIG. 5 illustrates an example interaction analyzer of the sentiment surfacing engine used to collect and analyze interaction data of the spectators viewing the online gaming of the video game, in accordance with one implementation of the disclosure.

FIG. 5 illustrates various components of an interaction analyzer 314 used to process the interaction data collected from the spectators' interactions during the online gaming of the video game, in one implementation. As earlier noted, the interaction data may include chat content, live video, live audio, etc. The chat content is obtained from the chat interface or instant message interface or social media interface, etc., through which the spectators and the players of the video game communicate with one another to express their thoughts and to provide comments. The interaction collection engine 311 collects the interactions of the spectators and forwards the interactions to the interaction analyzer 314. The interaction analyzer 314 analyzes the interactions to identify the different modes of data contained within the interactions. The various modalities correspond to the type of content included in the interactions. In implementations where live gameplay of the video game is being viewed, the interactions of the spectators are captured at the respective client devices during live gameplay and transmitted as data streams to the sentiment surfacing engine 304. These data streams may include different modes of data, such as live video data capturing expressions of the spectators, text data, audio data, graphic data, etc.

The interaction analyzer 314 receives and processes each one of the interactions (e.g., chat interactions, the live video and the audio content) in real time to identify the different modal data streams. The interaction analyzer 314 may include a plurality of sub-modules to process the different modal data streams identified from the interactions. In one implementation, the data streams pertaining to the chat content may be processed by a chat comment analyzer 314*a*, the data stream of live video content may be processed by a video content analyzer 314*b*, and the data stream of audio content may be processed by an audio content analyzer 314*c*. Similar process of collecting interactions from the spectators and identifying and processing the different data streams is followed when the gameplay of the video game is watched by spectators at delayed time.

The chat comment may include texts, memes, emojis, GIFs, etc., provided by different spectators as part of their interaction with other spectators or players or as part of general comments related to the gameplay of the video game or reactions related to spectators or players. The chat comment analyzer 314*a* identifies the different modal data that are included in the chat interactions and processes each modal data stream separately. For instance, the memes, GIFs, and emojis within the chat interactions may be extracted and provided as input to a facial detection algorithm 320*a*. The facial detection algorithm 320*a* engages machine learning algorithm 320 to identify the facial features and to crop the images included in the memes, GIFs, emojis, and other graphical content so as to include only the relevant facial features from the graphical content. The cropped images are provided as inputs to an expression recognition neural network 320*c*. The facial detection algorithm 320*a* and the expression recognition neural network 320*c* are part of the visual emotion analysis engine 325. The expression recognition neural network 320*c* is trained using various face samples. The expression recognition neural network 320*c* with the aid of the machine learning algorithm 320 uses the trained information to identify the salient emotions expressed in the memes, GIFs, emojis, and other graphic images provided by the spectators through the chat interface. The machine learning algorithm 320 compares each one of the facial features (e.g., eyes, nose, mouth, etc.,) individually, in combination and as a whole to the trained data from the expression recognition neural network 320*c* to find the salient emotions that best match the expressions of the graphic images. The identified salient emotions are provided as inputs to avatar visualizer 316. Similarly, the text content within the chat interactions are extracted and forwarded to the emotion keyword identification (ID) engine 320*d*.

In addition to processing chat content, the interaction analyzer 314 also processes live video of the spectators captured in real time while the spectators are watching the gameplay of the video game. The live video may be captured by one or more cameras that are facing the spectators. The cameras may be integrated within the spectators' client devices or may be external cameras that are communicatively connected to the client devices. The captured video includes at least the faces of the spectators. In addition to capturing the images of the spectators, the cameras may also capture the verbal reactions (e.g., outbursts, comments, reactions, etc.,) of the spectators as they are watching the video game. A video content analyzer 314*b* is used to forward the video portion of the live video to the facial detection algorithm 320*a*, which crops the images of the spectators to include facial features and forwards the cropped images to the expression recognition neural network 320*c*. The expression recognition neural network 320*c* processes the facial features from the cropped images of the spectators in a manner similar to how the graphic images from the chat content were processed. For instance, the machine learning algorithm 320 with the aid of the expression recognition neural network 320*c* identifies and compares each one of the facial features captured and the facial features as a whole of the spectator captured in the cropped images with the trained data from the expression recognition neural network to identify the salient emotions that best match the facial features of the spectators. In some cases, the analysis of the facial features may result in identifying expressions that correspond with multiple emotions. In such cases, the machine learning algorithm 320, with the aid of the expression recognition neural network 320*c*, may compute probability score 325*a* for each emotion identified from the facial features of the spectator captured in the images included in the live video. The salient emotion to associate with the spectator is determined based on the probability scores 325*a* of the plurality of emotions identified from the facial features of the spectator. In some implementations, a unimodal approach is adopted by feeding only the visual inputs from the live video to the expression recognition neural network 320*c* to identify the salient emotions detected from the interactions of the spectators. In other implementations, a multimodal approach may be adopted by pairing the video with the corresponding audio captured in the live video and forwarding the paired content (i.e., video and audio content) to the facial detection algorithm 320*a* for onward transmission to the expression recognition neural network 320*c*. As with the unimodal approach where only the cropped images from the video was used, in the multimodal approach, the expression recognition neural network 320*c* uses the cropped images from the video and the associated audio to identify the salient emotion detected from each spectator. The audio data may be used to further refine the salient emotions identified from the facial features of each spectator. The salient emotions of the plurality of spectators who make up the audience 103 are forwarded as inputs to the avatar visualizer 316.

In addition to the chat content and the video content, the audio content generated during the online gaming of the video game is processed by an audio content analyzer 314*c* of the interaction analyzer 314. The audio content may be generated by the spectators or players during the online gaming and may be captured using microphones embedded in the client devices or using external audio capturing devices (e.g., audio recorders, external microphones, etc.,) that are communicatively coupled to the client devices of the spectators. Alternately, the audio content may be from audio clips that were included in the chat content. In some implementations, the audio content analyzer 314*c* may process the audio content by applying filters to filter out the ambient noises and/or to selectively extract specific ones of the audio signals. The processed audio content is forwarded to an audio input processor 320*b*. The audio input processor 320*b* includes or engages a speech to text converter 320*b*1 to convert the audio into text. The converted text is forwarded by the audio input processor 320*b* to the keyword identification engine 320*d*. In addition to text content, the audio content is analyzed to identify certain audio features and use the audio features to detect emotion. For example, the pitch, amplitude, duration, etc., of the audio may convey different emotions, regardless of the content. Consequently, the audio input processor 320*b* may engage an audio analyzer module (not shown) with machine learning algorithm to analyze the audio content and extract certain audio features, such as pitch, amplitude, duration, etc., and predict the emotion associated with the extracted audio features of the audio content. The emotion identified from the extracted audio features of the audio content is forwarded to the avatar visualizer 316 as input from the interaction analyzer 314.

The keyword identification engine 320d receives the text content and the converted text content from the audio data included in the chat content and the audio content. The keyword identification engine 320d examines the text content and identifies keywords included therein. The text content may include keywords that pertain to expressions associated with certain ones of emotions or pertain to subjects of discussion within the chat interface. It should be noted that any reference to chat interface could be extended to include an interactive interface through which the spectators are able to communicate with one another and with players of the video game. The subjects of discussion may pertain to the game state or gameplay of the video game or may pertain to comments or behavior of spectators or players or may pertain to other content related to the video game. For instance, the subjects of discussion may relate to game style of players, comments related to the gameplay of the video game or content of the video game, comments related to spectators, players, comments in response to interactions of the spectators or players, etc. The keywords identified by the keyword identification engine 320d is forwarded to the keyword analysis engine 315 as input for further processing.

Figure 6:
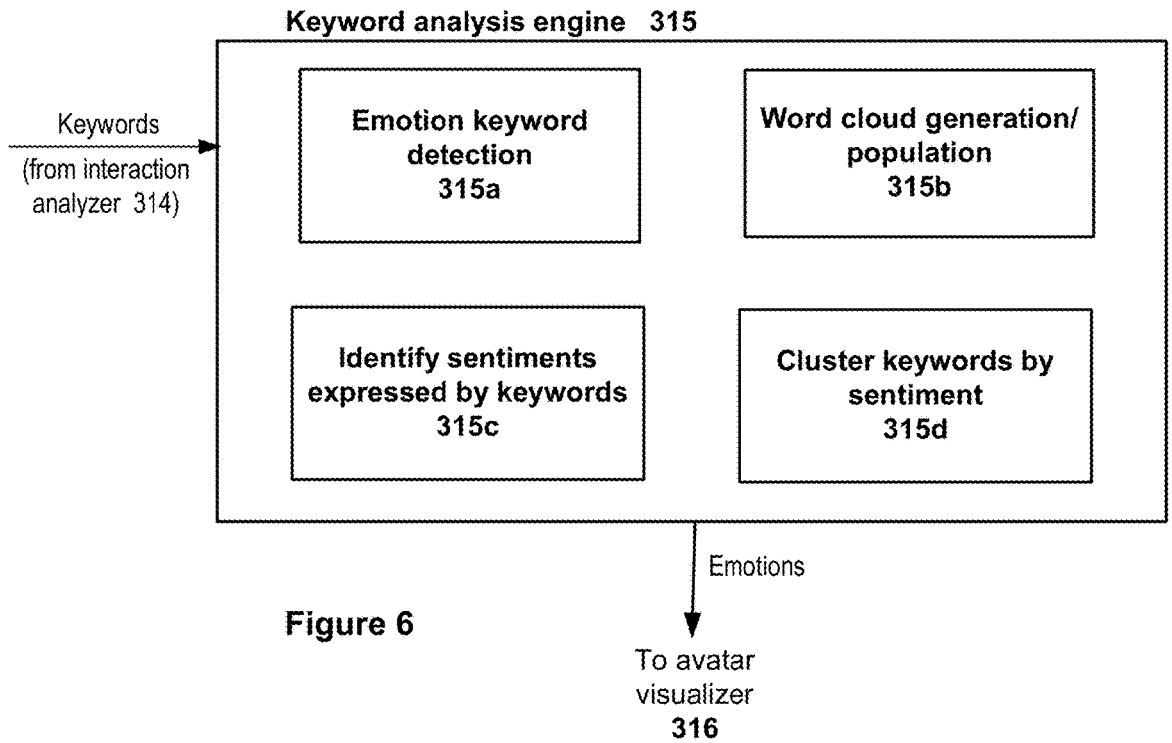
FIG. 6 illustrates an example keyword analysis engine of the sentiment surfacing engine used to identify the various emotions detected from the different spectators, in accordance with one implementation of the disclosure.

FIG. 6 illustrates the various components of the keyword analysis engine 315 used to identify the keywords pertaining to emotions and to cluster the spectators in accordance to the emotions expressed in their interactions. The keyword analysis engine 315, for example, begins by first performing an emotion keyword detection 315a by identifying keywords pertaining to basic emotions, such as happiness, fear, sadness, anger, surprise, disgust, jealous, anticipation, loneliness and trust, and keywords that pertain to expressions that can be associated with emotions. Some of the keywords identified by the interaction analyzer 314 may not directly express the emotion but are expressions that can be associated with emotions. The keyword analysis engine 315 engages machine learning algorithm 320 to identify expressive keywords that can be associated with different emotions. For example, keywords, such as amused or cheerful or excited, may be associated with happiness emotion, keywords, such as clingy or moody or fussy, may be associated with sadness emotion, keywords, such as panicky or scary or nervous, may be associated with fear emotion, and keywords, such as irritated or grumpy may be associated with anger emotion, etc. Of course, some of the expressive keywords may be synonyms of the corresponding emotions while other expressive keywords may not be. The machine learning algorithm 320 uses history of spectators interactions for the video game and/or other video games and the context in which the expressive keywords were provided at the interaction interface during current gameplay session to correctly identify the emotions for associating with the expressive keywords.

The keywords identifying basic or primary emotions and/or expressive keywords associated with emotions are used to dynamically generate and populate a word cloud (315b) in real time. The keywords in the word cloud correspond to the current emotions of the audience of spectators. As additional interactions are received from the spectators, additional keywords are identified from text and other interactions, and the word cloud is dynamically updated to reflect the emotions of the spectators.

The word cloud is examined to identify the various emotions expressed by the spectators (315c) in the audience. As part of identifying the various emotions, the keyword analysis engine 315, with the aid of the machine learning algorithm 320, identifies the various keywords that pertain to each emotion and indexes the keywords accordingly. The indexing of each keyword is done to identify the emotion to which the keyword belongs and to identify the spectators who included the keyword in their interactions during online gaming of the video game. The indexes are used to cluster the keywords by emotions (315d) into different vibe cliques, wherein each vibe clique corresponds to a distinct emotion. Thus, emotional keyword, such as happy, and expressive keywords, such as amused, cheerful, excited, etc., may be clustered together under a vibe clique associated with happy emotion. Similarly, emotional keyword, such as sad, and expressive keywords, such as clingy, moody or fussy are clustered under a vibe clique associated with sadness emotion, and emotional keywords such as afraid, fear, and expressive keywords, such as panicky, scary, nervous are clustered under a vibe clique associated with fear emotion, and so on. Based on the number of people that have used each keyword for expressing the associated emotion, the size of the keyword in the word cloud may be adjusted. The word cloud provides a visual representation of the various emotions expressed by the spectators through text or audio content, and the size of the keywords represents the number of times the keywords were used during interactions. In addition to clustering the spectators into different vibe cliques, the keyword analysis engine 315 also computes a confidence score for each vibe clique. The confidence score is computed as a number of spectators in the audience that express the dominant emotion or a variation of the dominant emotion in their interactions either through keywords or through expressions, wherein the dominant emotion of each spectator is determined using probability scores 325a computed for each emotion identified from the analysis of the facial features.

Figure 7:
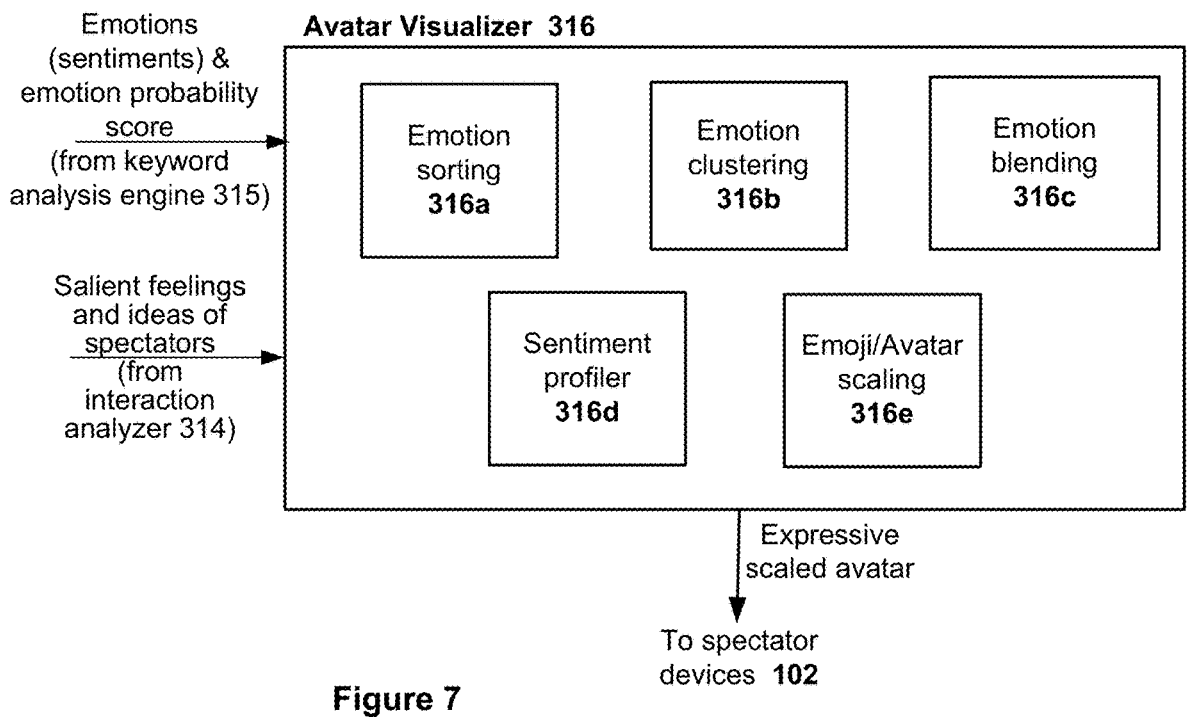
FIG. 7 illustrates an example avatar visualizer of the sentiment surfacing engine used to generate and scale avatars representing different emotions detected from the different spectators, in accordance with one implementation of the disclosure.

FIG. 7 illustrates an avatar visualizer 316 to generate representative avatars for rendering over an image representation of audience, in one implementation. The avatar visualizer 316 receives the emotions provided by the interaction analyzer 314 and the emotion keywords provided by the keyword analysis engine 315. The emotion keywords and the emotions are used to create expressive avatars to represent the distinct emotion for each cluster (i.e., vibe clique) of spectators identified in the audience. Additionally, the confidence scores associated with the different vibe cliques are used to scale the corresponding expressive avatars. To start with, the avatar visualizer 316 first sorts the emotions (316a) to determine the number of emotions that are identified from the interactions of the spectators. When the number of emotions identified are too many, some of the emotions are clustered together (316b) based on the level of similarity detected from those emotions. For instance, primary emotions (e.g., happy, sad, fear, anger, etc.,) may be identified from the inputs provided by the interaction analyzer 314 and the keyword analysis engine 315. A similarity score is computed for each of the emotions identified from the inputs. The similarity score of a primary emotion is defined as 1, and the similarity score of other emotions that are variants of the primary emotion are defined by a number between 0 and 1. For instance, using the keywords as examples, keyword happy representing a primary emotion is assigned similarity score of 1. Other keywords that are variants of the happy emotion, such as smile, content, ecstatic, amused, cheerful, excited, etc., are assigned a similarity score that is between 0 and 1. In one implementation, the similarity score for the keywords which are variants of the primary emotion may be determined based on the context in which the keywords were used in the interactions. The similarity scores are used to identify the dominant emotions (i.e., primary emotion) and to cluster the different emotions identified from the interactions into vibe cliques defined for the dominant emotions. The vibe cliques thus may be formed to include emotions with similarity scores that vary by a predefined percentage (e.g., 5% or 10%) or predefined number (e.g., 0.005-0.010) from the similarity scores of the dominant emotions. From the above example, the vibe clique for the happiness emotion may include spectators who expressed the happy emotion as well as spectators who expressed variations of the happy emotion (e.g., smile, content, ecstatic, amused, cheerful, excited, etc.).

As part of clustering the spectators into vibe cliques in accordance to emotions expressed by the spectators, a confidence score is computed for each vibe clique as the number of spectators that are expressing the emotion associated with the vibe clique. Accordingly, for each vibe clique, the confidence score is the number of spectators that are expressing the primary emotion as well as the variations of the primary emotion associated with the respective vibe clique. In addition to clustering the emotions and computing the confidence scores for the various emotions, the avatar visualizer 316 may also determine the number of emotions that are detected in the audience. When the number of emotions detected is too many, the avatar visualizer 316 may select only a predefined number of avatars to represent. For example, if the number of emotions identified/detected is 10 or 12 (e.g., 10 or 12 basic emotions), the avatar visualizer 316 may identify the top 5 emotions to represent using avatars, wherein the 5 may be a predefined number.

Additionally, the avatar visualizer 316 may determine whether the emotions expressed are positive or negative in nature. In one implementation, the avatar visualizer 316 may determine the positive or negative nature of each expressed emotion by referring to a psychology literature. The nature of the emotions may be used in presenting the avatars in different colors to provide a more visual representation of the emotions in the audience. For instance, the happy emotion is considered a positive emotion while anger or sadness or fear emotion is considered as a negative emotion. The positive emotions may be represented in green color while the negative emotions may be represented in red color. When more than one positive emotion is identified, each of the avatars representing the positive emotion may be represented as a variation in the intensity of the green color, with the most positive emotion having the most intense green color and the least positive emotion having a lighter shade of green. Similar variation may be applied when more than one negative emotion is detected in the audience. Alternatively, each of the basic emotions may be represented by a different color. In addition to the color, the avatar visualizer 316 may identify additional features to include (i.e., blend) when generating the expressive avatar for each emotion identified by the interaction analyzer 314 and the keyword analysis engine 315.

The avatar visualizer 316 then performs emotion profiling (316d) by adjusting the expressions of the appropriate avatar to match the emotion. During profiling, the avatar visualizer 316 blends in the various features (e.g., color, size, etc.,) that were identified for each emotion so as to generate an avatar that properly represents the dominant emotion in each vibe clique. In one implementation, the avatar is generated in the form of emojis. It is noted that rendering emojis as expressive avatars is one way of representing emotions and that other forms of avatars or representation may also be used.

Once the avatars are generated for each emotion, the avatar visualizer 316 uses the confidence score computed for each vibe clique to dynamically scale the generated avatar for each emotion. The dynamic scaling is done to provide a visual indication of a level of dominance each emotion has in the audience, with the avatar corresponding to the most dominant emotion being larger than others. The profiled and scaled avatars representing the different emotions are returned to the client devices of the spectators for rendering over an image representation of an audience presented alongside the content of the video game. The sentiment surfacing engine 304 using machine learning algorithm 320 provides a way to gauge the distribution of reactions of a large number of gaming spectators that are spread across a wide geographical area, quickly (i.e., in almost real-time). The aggregate visual feedback is intuitive to the spectators, allowing the spectators to visualize the various emotions of the audience. The visual representation also allows the spectators to compare their reactions with those of the different groups and to identify the group (i.e., vibe clique) in the audience whose emotions most align with their own.

Figures 8A, 8B:
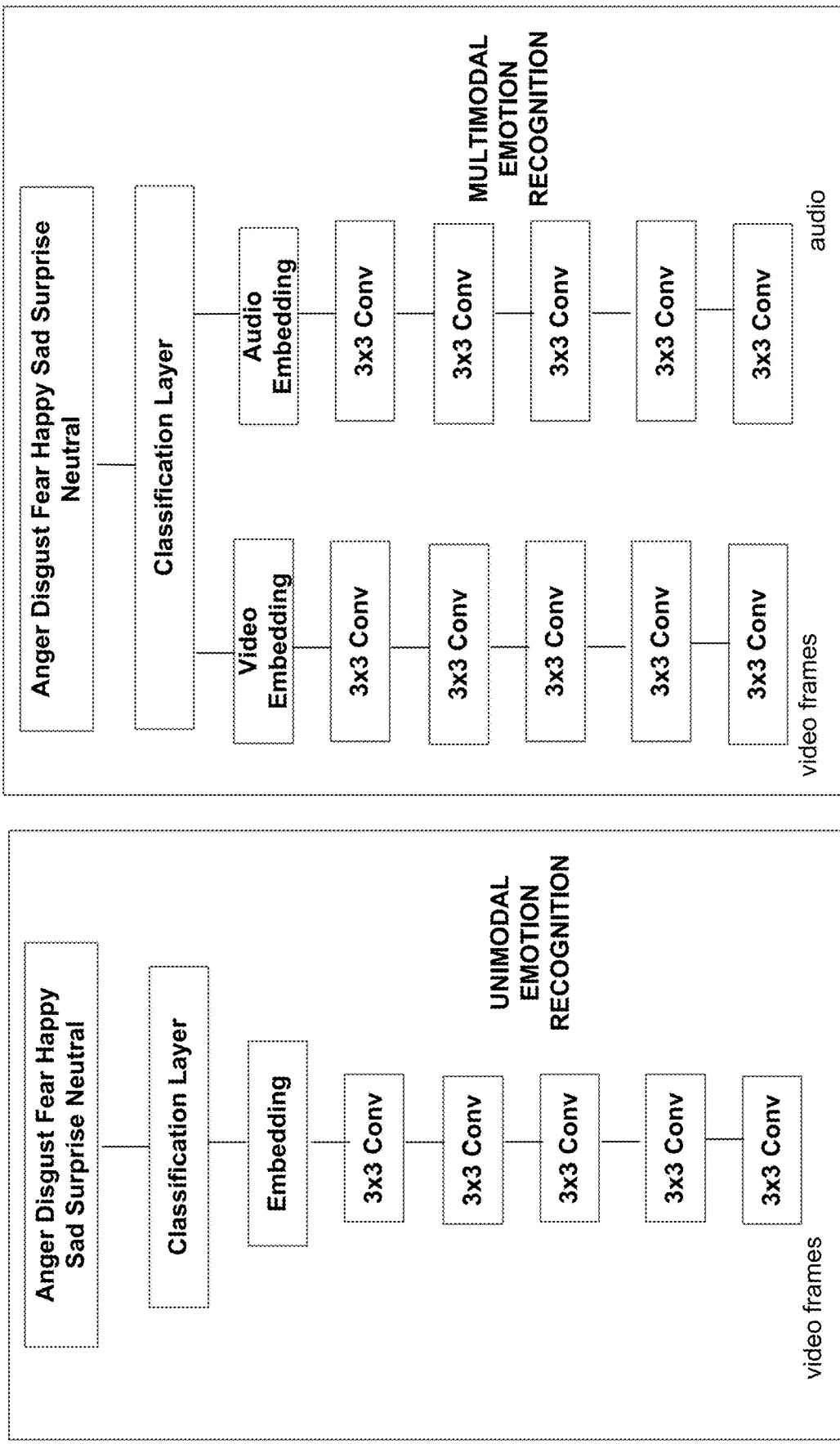
FIG. 8A illustrates a overview of video image processing as part of a unimodal emotion recognition process, in accordance with one implementation of the disclosure.
FIG. 8B illustrates a overview of video image processing as part of a multimodal emotion recognition process, in accordance with one implementation of the disclosure.

FIG. 8A illustrates the process of identifying the different emotions expressed by spectators based on analysis of video portion of live video using unimodal emotion recognition approach adopted by machine learning algorithm used by the sentiment surfacing engine 304, in accordance with one implementation. In this approach, the various video frames captured in the live video capture the facial features of the spectator. Each video frame captured in the live video is analyzed to identify the facial features embedded therein. Each video frame is cropped to include the facial features. The facial features are used by the machine learning model to classify the different emotions of the spectators.

The interaction analyzer module 314 processes each modality of content captured from or generated by each spectator independently to infer the expressed emotion and fuse the emotions from different modalities identified from the interaction data associated with each spectator. The fused emotions of each spectator are then provided to the avatar visualizer 316 as input to visualize the emotions using the avatars. In the example illustrated in FIG. 8A, the video modal data (i.e., live video) is being processed by the interaction analyzer 314. Other modal data identified in the interaction data can be processed in a similar manner. As shown, the interaction analyzer 314 may engage the visual emotion analysis engine 325 along with machine learning algorithm 320 for processing the video modal data included in the live video, wherein the processing includes extracting the features (e.g., facial features) of each spectator captured in the live video and independently inferring the emotion of the respective spectator, with the aid of the expression recognition neural network 320c. In the implementation illustrated in FIG. 8A, the expression recognition neural network is a unimodal-stream deep neural network that is trained to use the features identified from a specific modality and to predict the emotion for the features from the specific modality for a spectator. The emotion identified from each modal data is then combined with the emotions identified from other modal data for each spectator. For example, as shown in FIG. 8A, the emotion is predicted for the live video. The inferred emotion of the live video is then fused with the emotions predicted from other modalities included in the interaction data of the spectator, for example through weighted averaging. Thus, the emotion prediction for a spectator is based on fusing the predictions of different unimodal streams emotions for that spectator. The avatar visualizer 316 receives the fused emotions of each spectator, determines the distribution of the various emotions within the audience, and generates appropriate avatars to visualize the emotions of the spectators in the audience.

FIG. 8B illustrates the process of identifying the different emotions expressed by spectators based on analysis of video and audio portion of live video using a multimodal emotion recognition approach adopted using machine learning algorithm 320 of the sentiment surfacing engine 304, in accordance with one implementation. In the example of FIG. 8B, live video and audio features identified from different modal streams are processed to identify the emotions expressed by a spectator. The audio may be generated by the spectator when the video was being captured or when the spectator was interacting with other spectators. In this implementation, the features from each modality are used as input to train the expression recognition deep neural network 320c to predict the emotion of a spectator. The predicted emotion is then provided to the avatar visualizer 316 for generating avatars. The avatar visualizer 316 receives the predicted emotion of each spectator, determines the distribution of the various emotions within the audience, and generates avatars with appropriate size and color that reflects the distributions of the emotions of the spectators. In the implementation illustrated in FIG. 8B, the expression recognition neural network is a multi-modal deep neural network that is trained to use the features from the two different modalities to predict the emotion for a spectator. In the example illustrated in FIG. 8B, only two modalities (i.e., live video and audio streams) are shown to be combined to predict the emotions expressed by the spectators, whereas in reality more than two modalities of interaction data can be used to predict the emotions of the spectators.

Figure 8C:
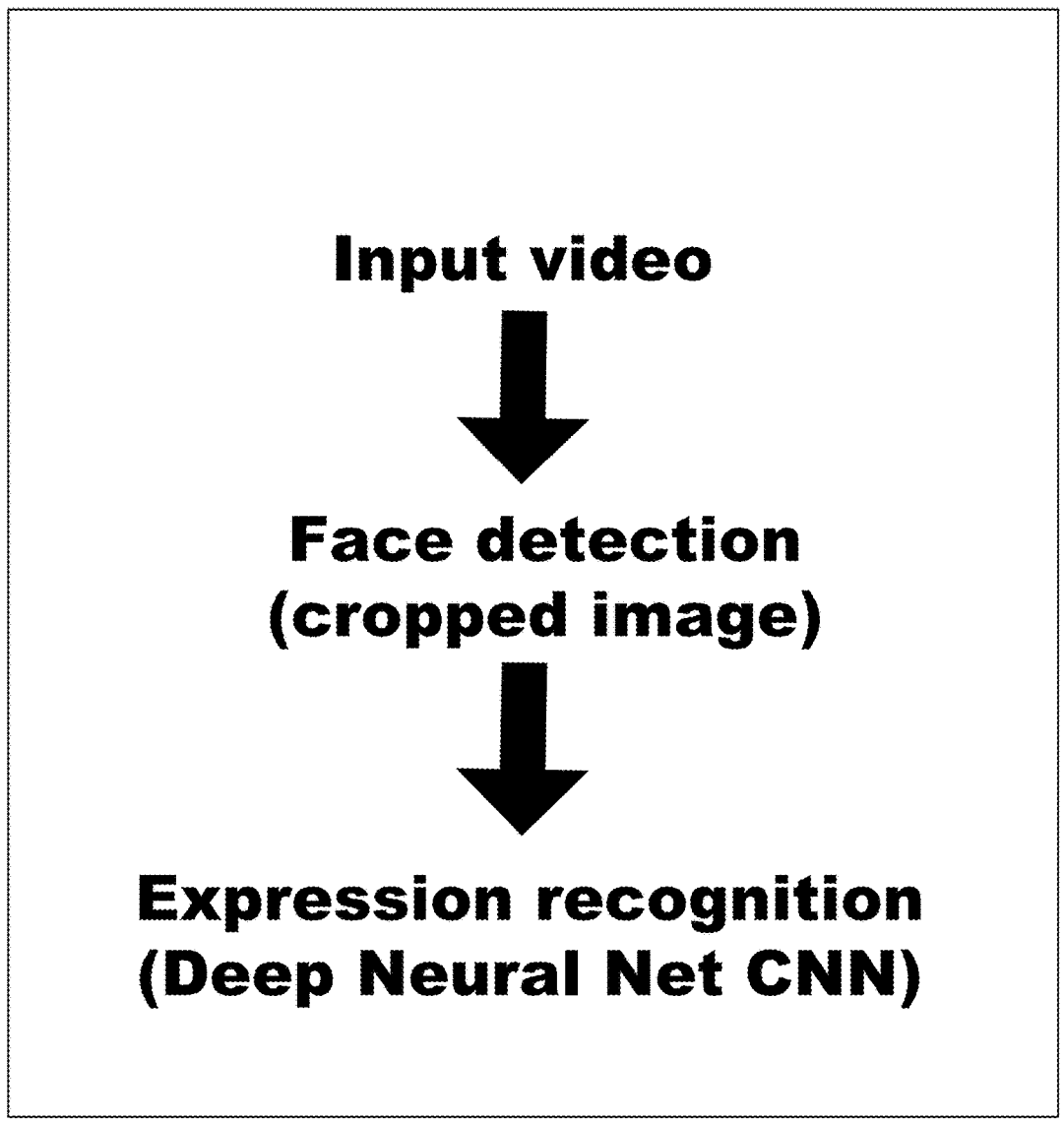
FIG. 8C illustrates a simplified unimodal emotion recognition process implemented using the sentiment surfacing engine for identifying different expressions detected from the interactions of the spectators viewing online gaming of the video game, in accordance with one implementation of the disclosure.

FIG. 8C illustrates the main steps taken in a unimodal approach for identifying emotions of spectators watching gameplay of a video game, in one implementation. In the illustrated example, the unimodal approach uses the live video of the spectator captured using cameras or image capturing devices incorporated within or associated with the client devices of the spectator as input. The live video of the spectator captured at the client device is forwarded to the cloud server. The sentiment surfacing engine 304 receives the live video, extracts the image of the spectator included within, detects the face of the spectator and crops the image of the spectator to retain only the facial features. The cropped image is then used to identify the expression of the spectator and relate the expression to an emotion using trained data from the expression recognition neural network.

Figure 9:
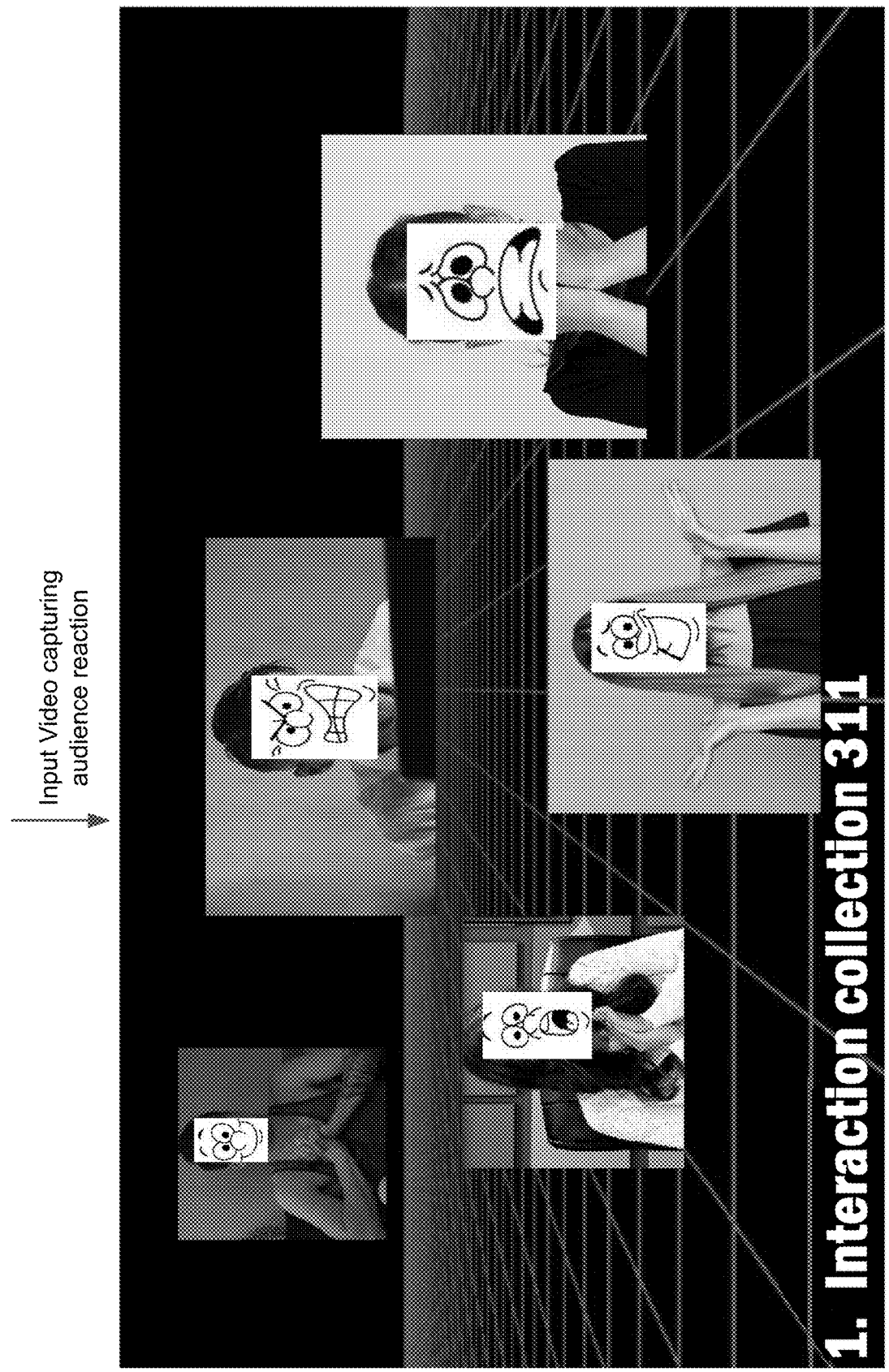
FIG. 9 illustrates a simplified screen view representation of information collection phase (i.e., operation) using video of different spectators captured while the spectators were viewing the online gaming of the video game, in accordance with one implementation of the disclosure.

FIG. 9 illustrates a sample screen showing images of spectators that were captured in live video, during an interaction collection phase, using interaction collection engine 311, in one implementation. The live video of the spectators who are part of the audience watching the gameplay are captured using image capturing devices and made available to the sentiment surfacing engine 304. The sample screen illustrated in FIG. 9 shows each spectator showing a different emotion, although that might not always be the case. The images of the spectators capture facial features in addition to other features, such as hands, body, etc. As the basic emotions are expressed using facial features, the sentiment surfacing engine 304 identifies the facial features from the images of the spectators and crops the images to include only the facial features showing the emotions. The cropped facial features are processed by the interaction analyzer 314 to identify the salient emotions detected from the spectators. In FIG. 9, in order to protect privacy of the spectators, graphical overlay has been provided over the actual faces in the images of the spectators, whereas in reality facial features from the actual faces of the spectators are used in determining emotions expressed by the spectators.

Figure 10:
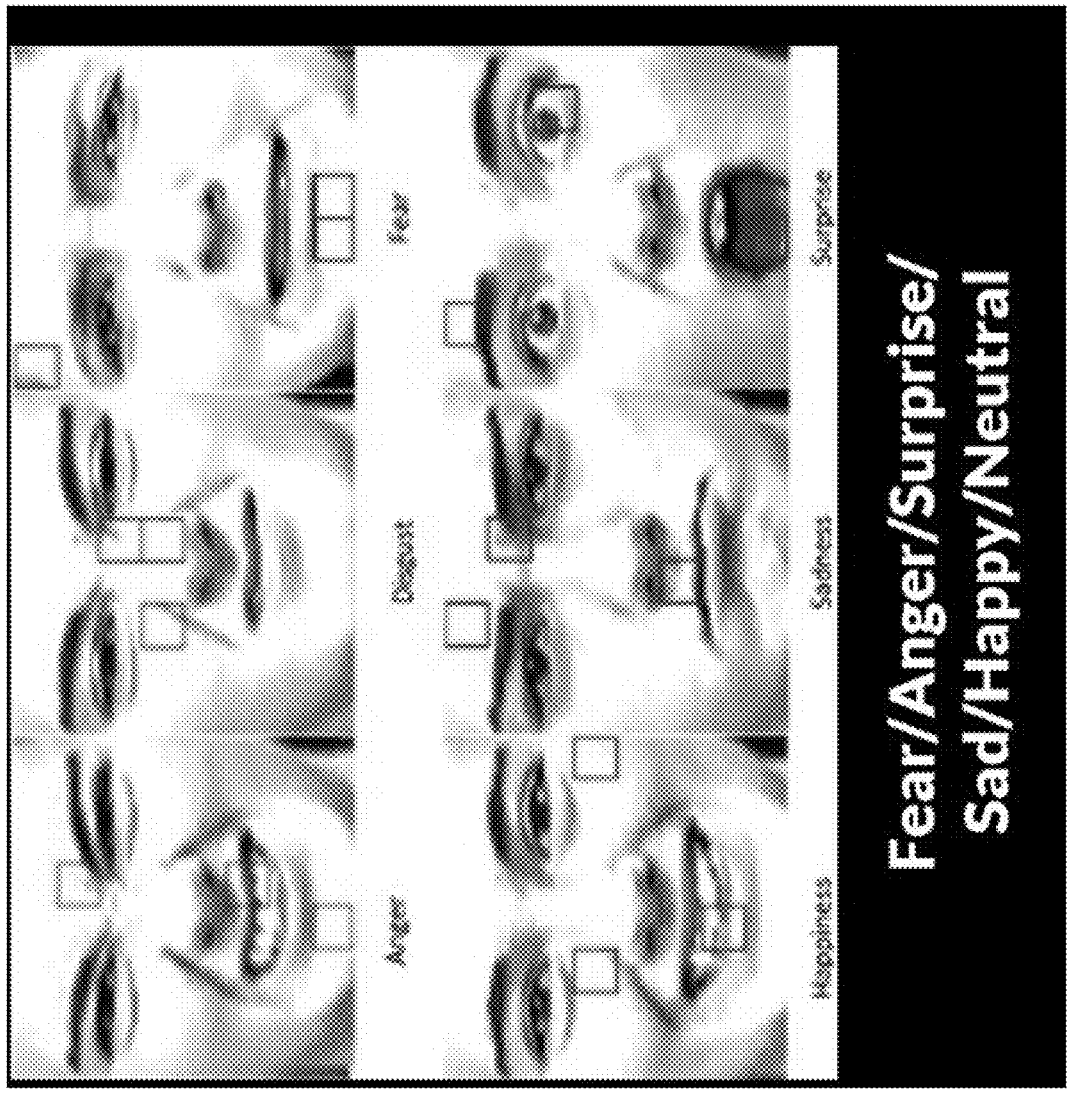
FIG. 10 illustrates a sample facial feature recognition process used to identify different expressions detected from the spectators, in accordance with one implementation of the disclosure.

FIG. 10 shows an illustration of the cropped images of a sample set of spectators, wherein the images were cropped to include only the facial features. The facial features are used by the interaction analyzer 314 to identify the salient emotions of the spectators, in one implementation. The interaction analyzer 314 examines various aspects (e.g., knitting of the eyebrows, crinkling of the nose, wrinkles on the forehead, extent to which the eyes are opened, smile or frown of the mouth and the extent of the smile or frown, etc.) of each and every facial feature, such as the eyebrow, the eyes, the nose, the forehead, the mouth, etc., and the facial features as a whole to identify the emotions detected from the spectators. In some implementations, the facial features are examined to identify one or more of the basic emotions (e.g., anger, disgust, fear, happiness, sadness, surprise, etc.).

Figure 11:
FIG. 11 illustrates a sample set of emotions recognized by analyzing facial features of a spectator captured in a video when the spectator was viewing the online gaming of the video game, in accordance with one implementation of the disclosure.

FIG. 11 illustrates an image of a spectator from a live video used to determine the emotion expressed by the spectator, in one implementation. As noted with reference to FIG. 10, the facial detection algorithm within an sentiment surfacing engine 304 receives the live video and extracts the image of the spectator. The extracted image is then cropped to include only the facial features (represented as blue square in FIG. 11) of the spectator. The various facial features of the cropped image are then analyzed to identify the emotion detected from the spectator. The analysis includes comparing each facial feature as well as combination of facial features with corresponding facial features in the trained data included in the emotion recognition neural network to identify the various emotions. In addition to identifying the various emotions, the facial detection algorithm also identifies a matching score for each emotion, wherein the matching score corresponds to level of matching of the specific one(s) of the facial features with the corresponding ones in the trained data. FIG. 11 shows one such example wherein the analysis of the facial features of a spectator has yielded a set of emotions and a corresponding matching score for each identified emotion. Although the implementation illustrated in FIG. 11 corresponds to live video the implementations can be extended to include analysis of other graphical images, such as emojis, memes, GIFs and other graphic content as well. Based on the matching score of the facial features identifying the level of matching, the expression of the spectator captured in the image represented in FIG. 11 may be determined to be neutral (i.e., the emotion with the highest matching score).

Figure 12:
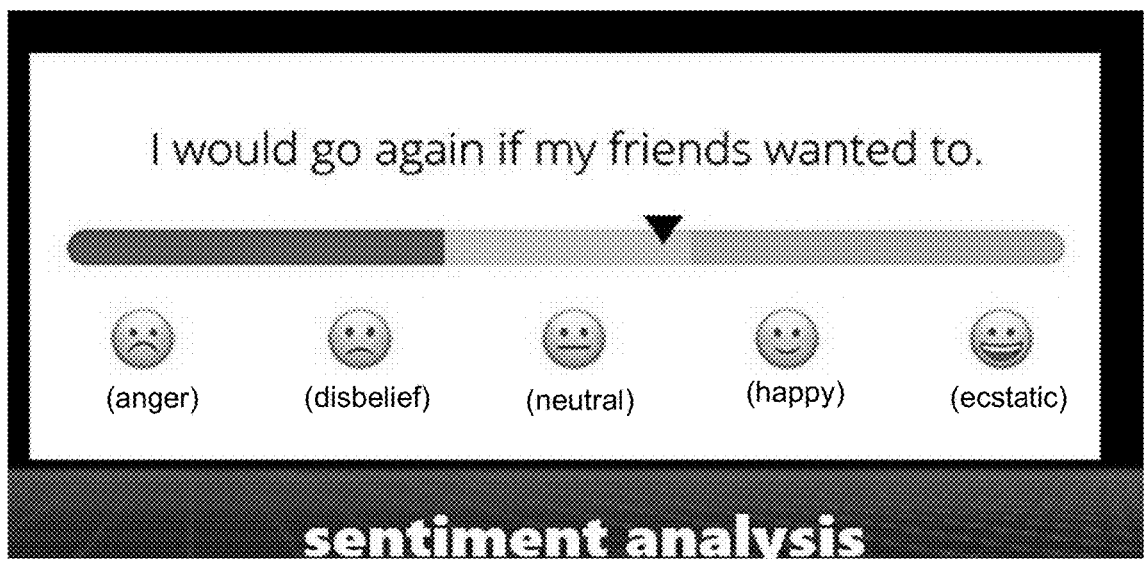
FIG. 12 illustrates a sample vibe rating used by the sentiment surfacing engine during emotion analysis to identify the emotion of the spectator, in accordance with one implementation of the disclosure.

FIG. 12 illustrates a sliding vibe rating scale that can be used for visually representing each emotion when generating the respective avatars, in one implementation. The emotions can have a positive vibe rating or a negative vibe rating. Based on the vibe rating of each emotion, the sentiment surfacing engine may define a color for an avatar generated to represent the respective emotion. For example, the anger emotion is shown to have a negative vibe rating and, as a result, the avatar representing the anger emotion may be represented in red. Similarly, the happy or ecstatic emotion is shown to have a positive vibe rating and as a result may be represented in green. In one implementation, depending on the vibe rating, the intensity of the colors representing the avatars may be adjusted. In the example shown in FIG. 12, both anger and disbelief have a negative vibe rating but the level of negative vibe for anger emotion may be greater than the negative vibe rating of the disbelief emotion. As a result, the avatar representing the anger emotion may be defined using a deeper red while the avatar representing the disbelief emotion may be defined using a lighter red. In the implementation illustrated in FIG. 12, the vibe rating scale also shows a sample color code used for representing the various emotions in accordance to the vibe rating associated with the emotions. It is noted that other color schemes may be used to represent the emotions including using a distinct color to represent each distinct emotion.

Figure 13:
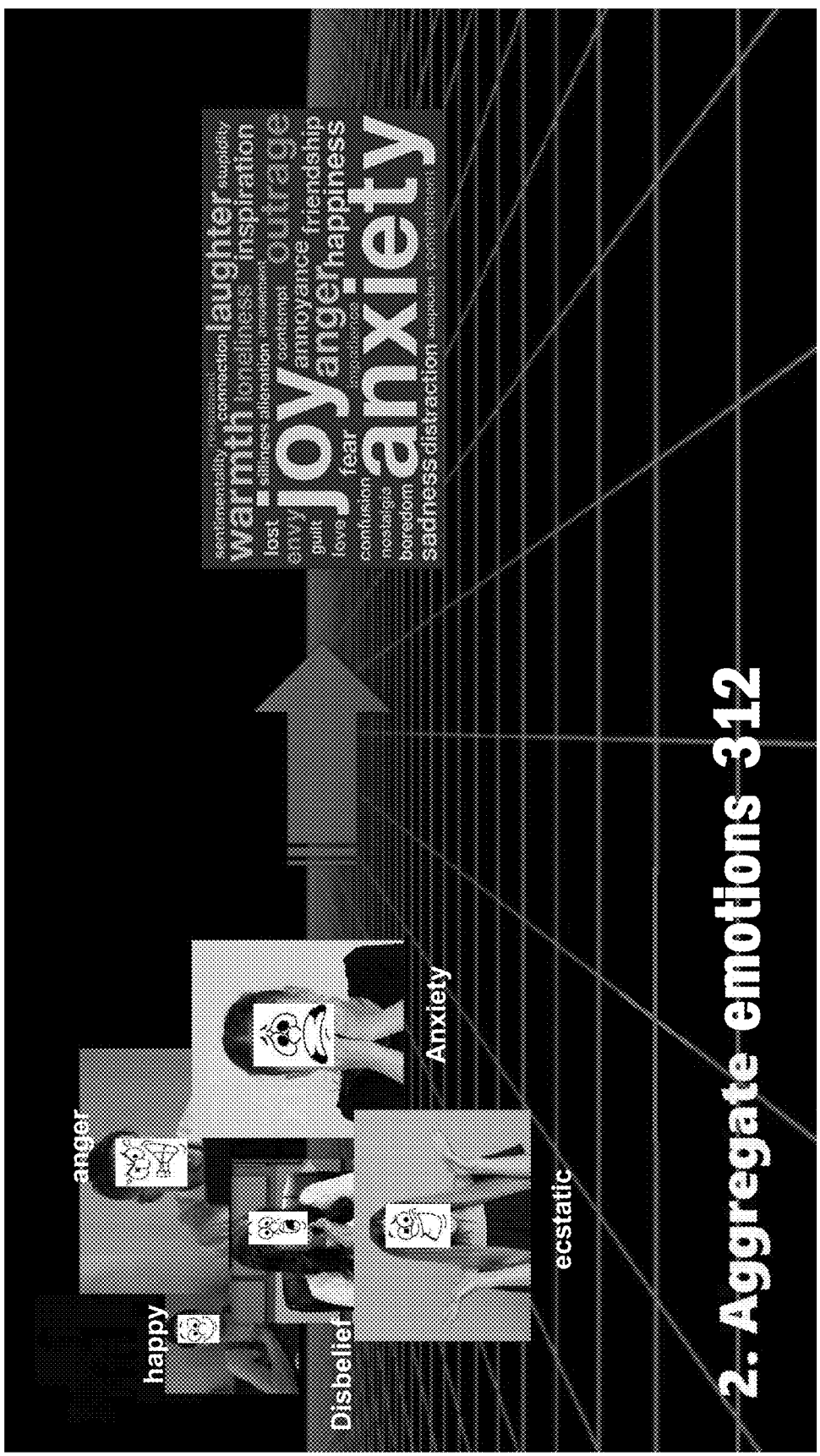
FIG. 13 illustrates a simplified screen view representation of emotion aggregation phase (i.e., operation) using the spectator interactions gathered during online gaming of the video game, in accordance with one implementation of the disclosure.

FIG. 13 illustrates a representation of an emotion aggregation step (also referred to as "emotion aggregation phase") 312 wherein certain ones of the interactions of spectators are used to dynamically generate and populate a word cloud with keywords representing emotions and expressive keywords related to emotions gathered from the spectators during gameplay of the video game, in one implementation. In the example illustrated in FIG. 13, the live videos of spectators are used to populate the word cloud. In one example, the sentiment surfacing engine 304 adopts a unimodal approach to populate the word cloud by using information from the live video of the spectators. It is to be noted that the various implementations are not restricted to the unimodal approach but can include multimodal approach as well, wherein the live video, audio content, chat content may all be processed simultaneously to populate the word cloud. The keywords in the word cloud are used for identifying the emotions of the crowd (i.e., audience) of spectators. In the implementation illustrated in FIG. 13, some of the keywords in the word cloud are rendered more prominently (i.e., visually represented largely) than others. This may be to indicate the level of dominance of that keyword in the interactions of the spectators (i.e., number of spectators that have expressed the specific keywords during their interactions). It should be noted that the word cloud itself is not actually rendered on any display screen of any client device but is shown in FIG. 13 for illustration purposes to provide a visual representation of which keywords are more dominant than others in spectator interactions. The keywords in the word cloud represent the emotions or expressive keywords that are associated with the emotions. As with FIG. 9, in the example illustration of FIG. 13, graphical overlay has been provided over the actual faces of the spectators captured in the images of the spectators, in order to protect privacy of the spectators, whereas in reality facial features from the actual faces of the spectators captured in the images of the live video are used in populating the word cloud.

Figure 14:
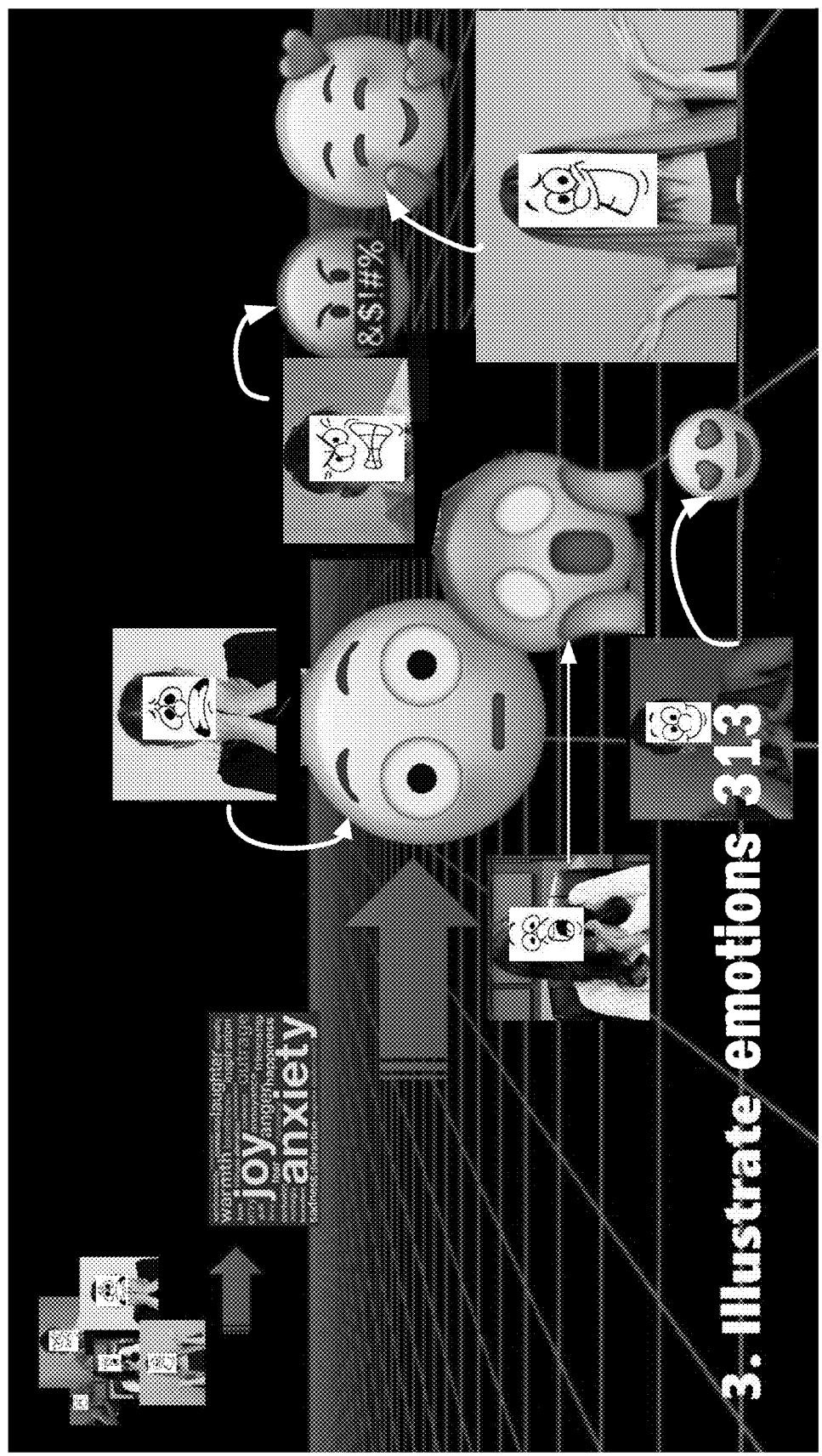
FIG. 14 illustrates a simplified screen view representation of the emotion illustration phase performed by sentiment surfacing engine, in accordance with one implementation of the disclosure.

FIG. 14 illustrates an example representation of the emotion illustration phase of the sentiment surfacing engine 304, in one implementation. As shown in the example representation, once the word cloud is generated, the sentiment surfacing engine clusters the spectators who generated the keywords in accordance to the emotions that they represent, such that each cluster of spectators is associated with a distinct emotion. Based on the clustering of spectators, the sentiment surfacing engine 304 identifies an avatar for each cluster based on emotion, adjusts the expressions of the avatars, blends various features identified for each emotion and forwards the blended avatars for rendering at the client device of the spectators. FIG. 14 shows some of the avatar representations that were generated for the different emotions identified from the sample live video of spectators captured during interaction collection phase of FIG. 9. For illustration purposes only, in the example illustrated in FIG. 14, the avatars are shown to have a one-to-one correlation with the images of spectators illustrated in FIG. 9, whereas in reality, the correlation between the avatar to the spectators are actually one-to-many. Although, in the example illustrated in FIG. 14, only the results of the live videos of spectators are shown to be used for populating the word cloud and generating avatars, in reality, other data, such as text data, audio data, memes, GIFs, emojis, other graphic content, etc., generated by the spectators are also used in populating the word cloud and identifying avatars for representing the emotions. As with FIG. 9, in the example illustration of FIG. 14, graphical overlay has been provided over the actual faces of the spectators captured in the images of the spectators in order to protect privacy of the spectators, whereas in reality facial features from the actual faces of the spectators captured in the images are used in determining emotions expressed by the spectators and to provide avatar representations.

Figure 15:
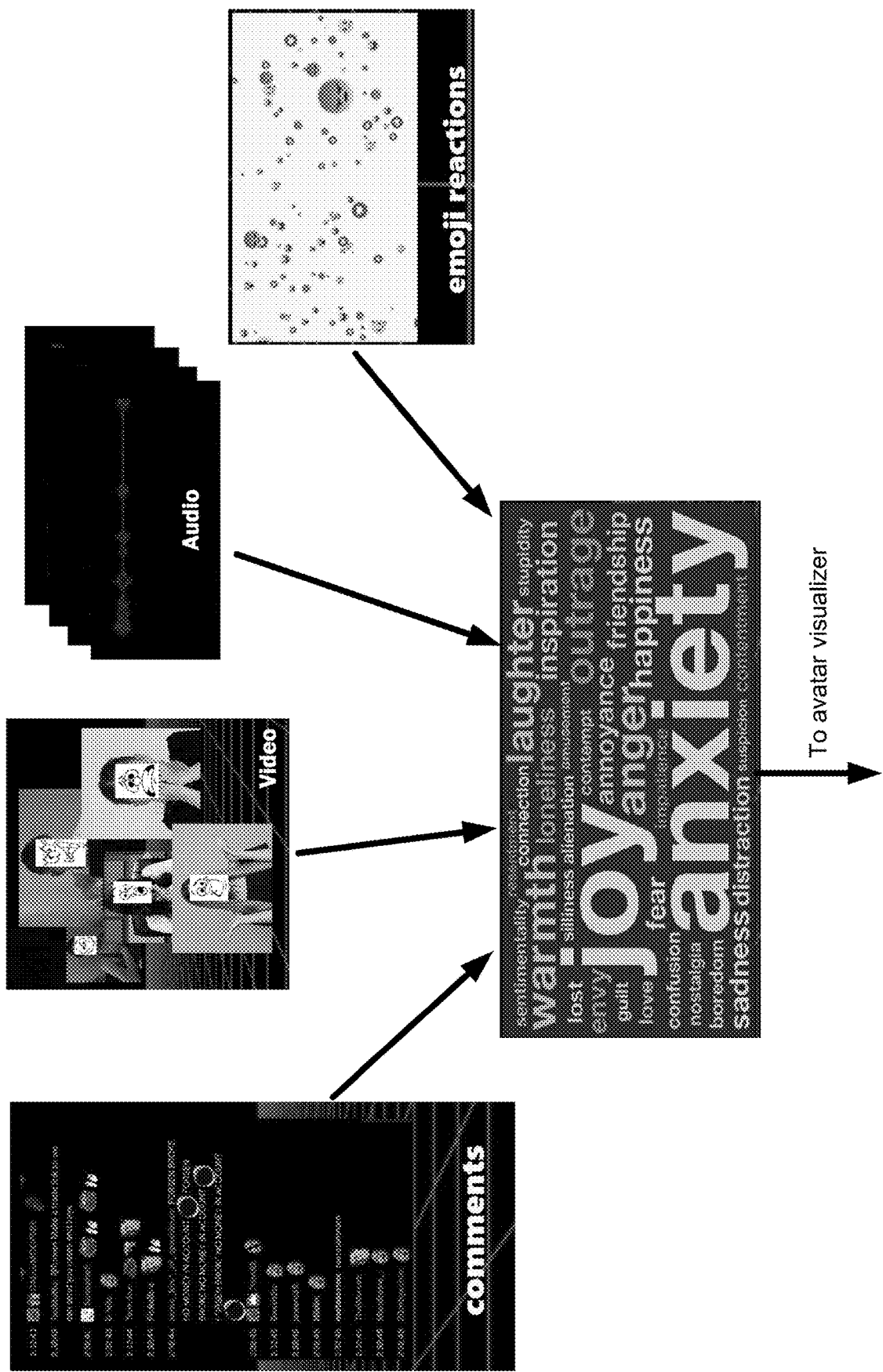
FIG. 15 illustrates the various interaction inputs of the spectators that are gathered from audience of spectators to generate word cloud that is used to recognize keywords representing emotions detected from the spectators, in accordance with one implementation of the disclosure.

FIG. 15 provides a visual representation of the various types of interactions that can be used to generate the word cloud, which is used to generate the expressive avatars for rendering over the image representation of the audience, in one implementation. The types of interactions include chat or message content (including text, emojis, GIFs, memes, other graphic content, etc.,), live video content (capturing expressions of spectators while they are watching the online gaming of the video game), audio comments/content, and emoji reactions. Different spectators may elect to share none, select ones or all types of interactions generated by them while they are watching the gameplay of the video game. Based on the sharing option selected by the spectators, the sentiment surfacing engine 304 collects the corresponding types of interactions from the different spectators and uses the interactions to generate the word cloud, which is used along with expressions of the spectators to identify the emotions and to generate and scale the avatars for each identified emotion. As with FIGS. 9, 13 and 14, in the example illustration of FIG. 15, graphical overlays have been provided over the actual faces of the spectators captured in the images of the spectators in order to protect privacy of the spectators, whereas in reality facial features from the actual faces of the spectators captured in the images of the live video are used in determining the emotions.

In one implementation, the interactions of the spectators are collected during live video game, used for generating the word cloud, generate avatars to represent the emotions identified from the word cloud, and return the avatars to client devices of the spectators that have accessed the video game to watch the game play. The generated word cloud and the avatars are saved in sentiment database 334 for use during replay of the video game. During replay, the interactions from the spectators that are watching the replay are collected and used to update the word cloud and the avatars representing the emotions identified from the word cloud and other interactions.

Figure 16:
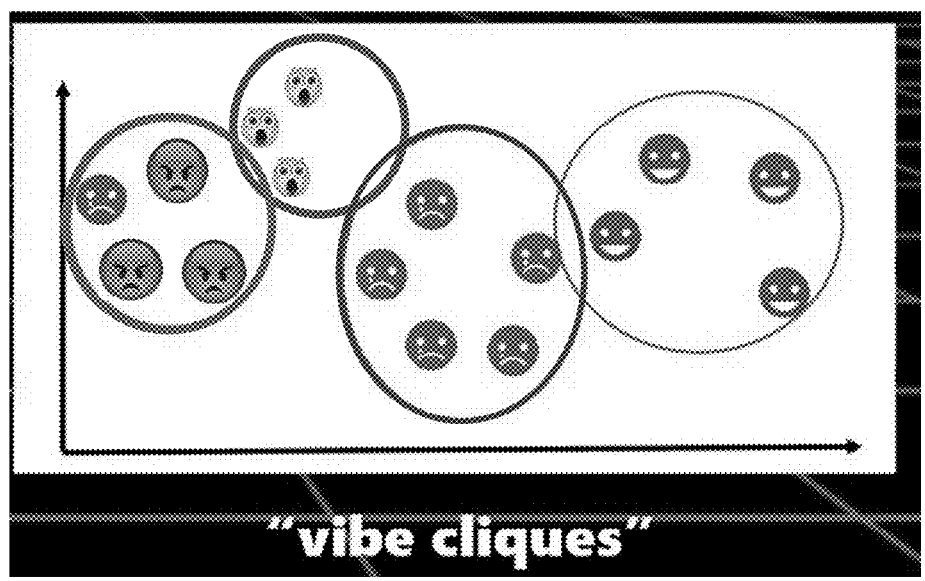
FIG. 16 illustrates sample vibe cliques defined by the sentiment surfacing engine, in accordance with one implementation of the disclosure.

FIG. 16 illustrates a simple representation of a temporal graph of vibe cliques that are generated by clustering similar vibes, in one implementation. The vibe cliques illustrated in FIG. 16 provide a visual representation of the number of vibe cliques generated for the different vibes detected from the spectators for a specific time in the video game when changes in the emotions were detected. For example, the temporal graph may be plotted with the timeline of gameplay along the x-axis and the constitution of the vibe clique (and the corresponding confidence score) along the y-axis. The timeline identifies specific time when an event occurred during gameplay of the video game that caused changes in emotions of the spectators. The changes detected in the video game may or may not cause changes in the constitution of the vibe cliques. In some implementations, when the number of emotions identified from the interactions of the spectators is too many, the sentiment surfacing engine may cluster vibes that are similar in nature into a single vibe clique. In alternate implementation, each vibe identified from the spectators are used to generate a corresponding vibe clique and the sentiment surfacing engine selects a predefined number of vibe cliques with highest probability score to represent using avatars. In the example illustrated in FIG. 16, four vibe cliques are defined to include four different types of vibes, whereas in reality there could be more than four vibe cliques defined from the emotions of the spectators.

Figure 17:
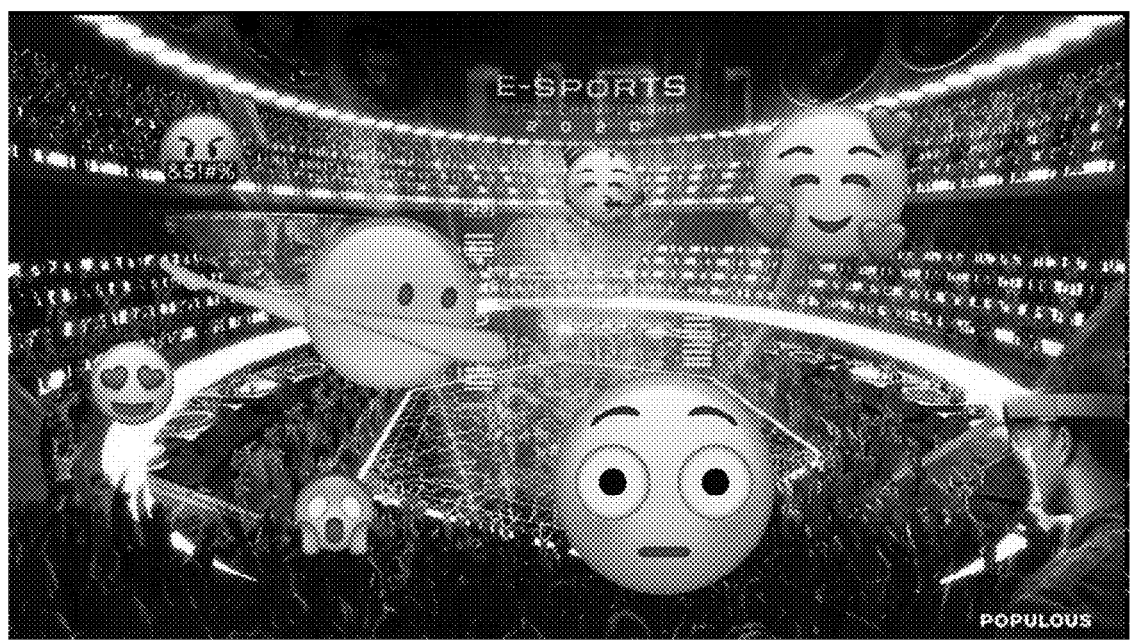
FIG. 17 illustrates sample avatars/emojis representing the emotions of the different vibe cliques presented for the audience of spectators, in accordance with one implementation of the disclosure.

FIG. 17 illustrates a sample view of a representative image of an audience over which images of expressive avatars are overlaid, in one implementation. The expressive avatars represent different emotions that were identified from the interactions of the spectators. The size, color and other features of the avatars representing each emotion are scaled to provide an appropriate visual representation of the various emotions detected from the spectators, the number of spectators that express each identified emotion, the associated vibe rating of each emotion, etc. In one implementation, the spectators in the audience may be associated with different geo locations and the spectators in each geo location may be associated with specific emotion. For example, spectators in geo locations 1 may be associated with or follow player 1 or team 1, spectators in geo locations 2 may be associated with or follow player 2 or team 2, etc. Consequently, the spectators supporting each player or team may express similar emotions. In this example, the avatars representing different emotions (i.e., vibes) may be rendered on a map with each avatar representing a particular vibe rendered over a geo location that corresponds with the spectators associated with the vibe clique of the particular vibe. The expressive avatar provides a visual view of the various emotions expressed in the audience and allows a spectator to identify and join a group of spectators (i.e., vibe clique) whose emotions align with their own emotions, providing the spectators with a feeling that they are hanging out with their friends or like-minded spectators when watching the gameplay of the video game.

In one implementation, once the vibe cliques are formed, expressions of the spectators included in each vibe clique are monitored to detect any changes in the expressions. The expressions of the spectators may change based on current game state of the gameplay of the video game, which is influenced by game events and interactions of the players. As the players score or lose points or game prizes or game life, etc., the spectators' emotions may change to reflect their emotions toward the player, toward the result of gameplay, etc. In addition to in-game changes, the emotions of the spectators may also be influenced by other spectators' reactions to the gameplay, players comments or actions during gameplay, other spectators reactions to the reactions/interactions of the spectators, etc. The sentiment surfacing engine 304 monitors the changes in the emotions of the spectators in each vibe clique and adjusts the emotions of the avatars of the respective vibe cliques dynamically to reflect the current emotion of the group of spectators included in the vibe clique.

In one implementation, the confidence score identifying the number of spectators in each vibe clique expressing the emotion of the vibe clique may change over time. This may be due to some spectators in the group forming the vibe clique leaving the group or new spectators joining the group. The new spectators may be joining a first group (i.e., first cluster) from a second group (i.e., second cluster) representing a different vibe clique or vice versa. Alternatively, new spectators may be joining to watch the gameplay of the video game. In some implementations, some of the spectators may join the first group just to get a feel for the emotions and interactions expressed by the spectators of the first group. Options may be provided on a user interface alongside the content of the video game and the image representation of the audience, to spectators of the first group to provide permission for the spectators from different groups (e.g., second group, third group, etc.,) to join the first group. Additional options may be provided to the spectators of the other groups (e.g., second group, third group, etc.,) to request to join the first group. When the request is accepted by the first group or based on the settings of the first group, the spectators from the second, third, etc., groups may be allowed to join the group. This may be akin to a spectator hanging out with their friends who may be supporting different teams while watching a live game played in a stadium, for example. When a spectator from the second group, or the third group, etc., elect to join the first group, the spectator is automatically detached or disassociated from the second or third group, and attached to or associated with the first group. Similar association and disassociation may be envisioned when the spectators from the first group elect or request to join the other groups.

In one implementation, associating a spectator to a group allows the spectator to access the interactions of the spectators of the group. Similarly, disassociating the spectator from a group results in the spectator being prevented from accessing the interactions of the spectators of the group from which the spectator was disassociated. Providing this option allows the spectators to feel the vibes of not only the spectators of their own vibe clique but also the vibes of other spectators of different vibe cliques. In another implementation, spectators within a cluster are allowed to interact with other spectators within the cluster and access the interactions of other spectators within the cluster. In this implementation, the spectators of a first cluster are not allowed to interact with spectators of other clusters and do not have access to the interactions of spectators of the other clusters.

In one implementation, an interactive temporal graph may be generated and presented to the spectators in the audience to indicate reaction intensities of different emotions expressed by or detected from the spectators of the video game. FIG. 16 illustrates one such example. The reaction intensities of different emotions may vary based on the changes occurring in the gameplay of the video game. In one implementation, the reaction intensities captured in the interactive temporal graph are linked to particular portions of the gameplay of the video game so that a spectator may be able to visualize the reaction intensities expressed for a particular emotion in the temporal graph and correlate it to specific changes occurring in the gameplay of the video game (e.g., an event). In some implementations, the spectator may be able to click on any one of the vibe cliques included in the temporal graph for a specific time and the spectator may be able to view the gameplay of the video game that corresponds with the reaction intensities of the particular vibe clique represented in the temporal graph for the specific time. The interactive temporal graph may be in addition to or may be in place of the avatars that are presented over the image representation of the audience rendered alongside the content of the video game. The temporal graph may be generated during the live streaming of the video game and may also be stored in the gameplay datastore 332 for subsequent retrieval and presentation. Alternatively, the temporal graph may be stored in the sentiment database 334 with the word cloud and the vibe cliques identified from the spectator interactions. When the video game is replayed (i.e., streamed at delayed time), the stored temporal graph may be retrieved and presented to the spectators watching the delayed replay of the video game. As the spectators interact or react to different events or actions occurring in the gameplay of the video game during replay, a new temporal graph may be generated to include data from the stored temporal graph and the additional reactions identified from the interactions of the spectators watching the delayed replay of the video game. The new temporal graph is stored in either the gameplay datastore 332 or the sentiment database 334 and retrieved as and when the video game replay is rendered to spectators.

In some implementations, the temporal graph may be represented as a line graph. In this implementation, the line graph may include graph lines to represent different emotions, with each emotion being represented by a different graph line. In some implementations, an avatar capturing an emotion represented by a graph line may be rendered alongside or over the graph line to provide a visual indication of the emotion that corresponds to that graph line. The line graph and the temporal graph illustrated in FIG. 16 are some examples of illustrating the emotions that are detected from the spectators in the audience and that other forms of visually representing the emotions of the audience may also be envisioned.

In some implementations, presenting the avatars at the client devices of the spectators may include providing a user interface with a segmenting option for the spectators to choose for rendering the avatars. The spectators may wish to view the emotions of the audience at specific location on the screen and not crowd the screen that is rendering the content of the video game or hinder rendering of other content. In these implementations, the avatars may be rendered on their own or may be rendered over an image representation of the audience. The display screen may be segmented into a plurality of segments (e.g., lower half, upper half, left side, right side, etc.), and the segmenting options may include these segments for each spectator to choose for rendering the avatars. In addition to identifying the segments, options for rendering the avatars on their own or over an image representation of the audience may also be provided to each spectator. Based on the selection of each spectator, the avatars representing the different emotions detected in the audience may be rendered in the specified segment over or without the image representation of the audience. The segmenting option provides a certain level of autonomy for the spectators to visualize the emotions of the spectators in the audience while having the ability to view the gameplay of the video game unhindered.

In addition to rendering options, one or more formatting options may also be provided at the user interface for the spectators to select from to render the expressive avatars. Some of the formatting options that may be included in the user interface for spectator selection include transparency format, an overlay format, or a presentation format. Of course the aforementioned formatting options are provided as mere examples and should not be considered restrictive. Other formatting options may also be included. The avatars may be rendered in accordance to the formatting option and the segment option selected by each spectator, wherein the avatars are rendered on their own or over the image representation of the audience.

In one implementation, in addition to generating avatars and adjusting emotions of the avatars, the sentiment surfacing engine 304 may identify a specific one of the spectators in each vibe clique, capture the reactions of the specific spectator during defining game moments and render the captured reactions alongside the content of the video game to provide reaction highlights. In this implementation, the specific spectator identified for a vibe clique may be presented in place of the expressive avatar. In other implementations, the reactions of the specific spectator may be provided in addition to the expressive avatar for the vibe clique. The specific spectator may be identified based on the type and number of comments the reactions of the specific spectator garnered from other spectators in the group or from other groups.

In one implementation, the reactions of the specific spectator of a particular vibe clique may be captured and presented by first identifying an action that is scheduled to occur in the gameplay of the video game. The action may be identified using the current game state of the video game and from the game logic of the video game. The specific spectator from among the spectators in the vibe clique may be identified based on the type and amount of reactions the specific spectator provided to different actions that occurred in the current gameplay of the video game or during prior gameplay of the video game. Based on this information, the sentiment surfacing engine 304 may predictively send a signal to the one or more image capturing devices used to capture the live video of the spectators to zoom in on the specific spectator to capture their reactions during the occurrence of the identified action. The captured video of the specific spectator is dynamically analyzed and presented with or in place of the expressive avatars generated for the particular vibe clique. In alternate implementations, the specific spectator of a particular group may be identified based on the type and amount of comments related to the expressions of the specific spectator garnered from the remaining spectators in the particular group (i.e., vibe clique). In some implementations, one or more spectators of specific ones of the vibe cliques may be selected for presenting their expressions captured during live video streaming. In alternate implementations, each vibe clique may identify specific one of the spectators and present the expressions detected from the specific spectator. In such implementations, the specific spectator may be identified based on reactions of other spectators in the respective group of spectators reacting to the reactions of the specific spectator. In alternate implementations, the specific spectator may be chosen randomly.

Figure 18:
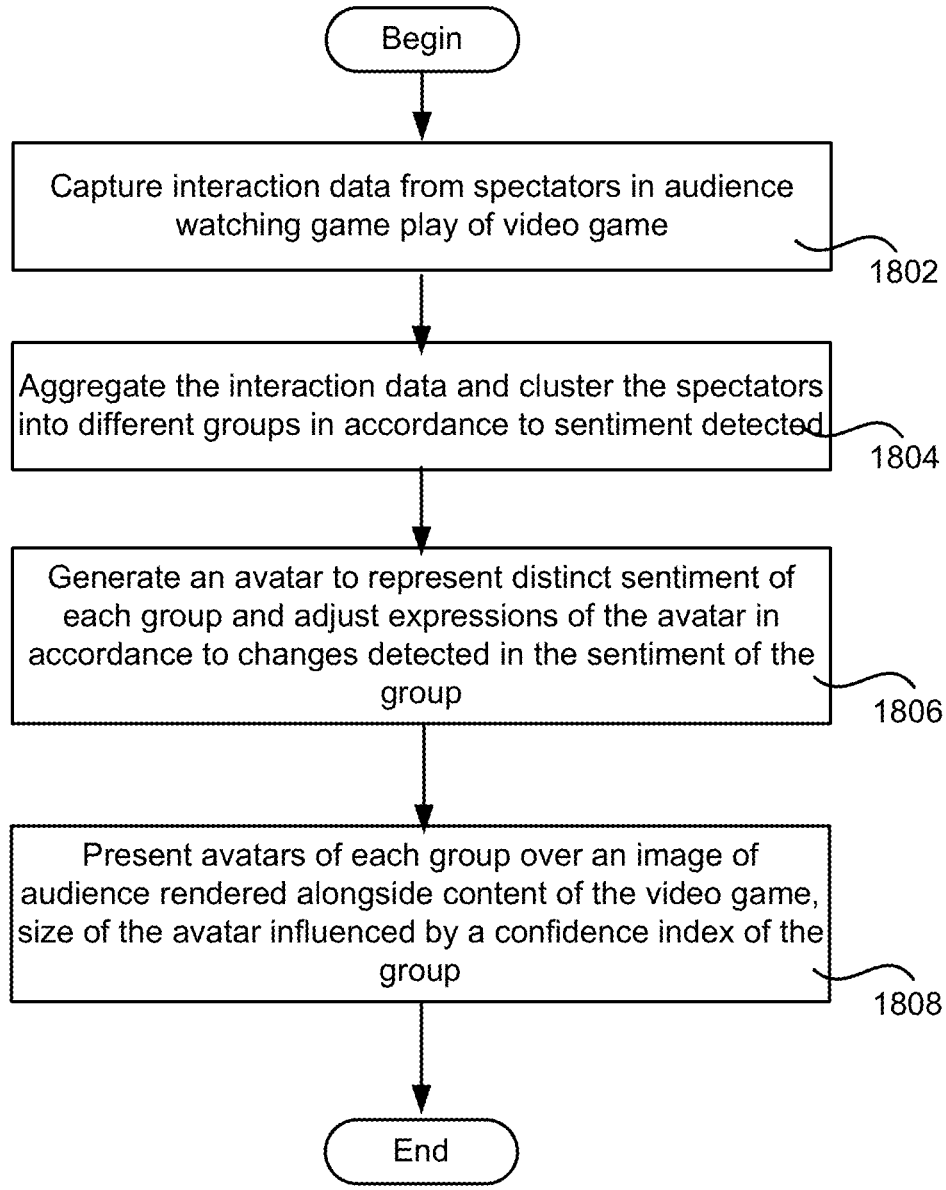
FIG. 18 illustrates method operations for surfacing emotion of spectators and presenting avatars representing the surfaced emotion alongside content of the video game, in accordance with one implementation of the disclosure.

FIG. 18 illustrates a method for surfacing emotions of an audience of spectators watching a gameplay of a video game, in one implementation. The spectators, in this implementation, may be watching a live gameplay of the video game. In other implementation, the spectators may be watching a replay of the gameplay of the video game. In one example, operation 1802 may be configured to capture interaction data from spectators in the audience watching gameplay of the video game. The interaction data may include expressions on the spectators face as they are watching the gameplay captured by one or more image capturing devices or may be interactions generated by the spectators, such as audio, text, memes, GIFs, emojis, etc., via interaction interface such as a chat interface, message board, social media interface, etc., or audio captured via microphones or other audio detection and/or recording devices. The image capturing devices may be cameras or other image capturing devices that are part of the client device, such as mobile computing device (e.g., phone, laptop computer, tablet computing device, etc.,), or may be external image capturing devices that are communicatively connected to the client devices. The images of the spectators are captured as live video by the image capturing devices and transmitted to the sentiment surfacing engine 304 executing on the game cloud server 300. The images include facial features that are used to determine the emotions detected from the spectators while they are watching the online gaming of the video game. Similar to the live video of the spectators, the interactions provided via the interaction interface are also transmitted to the sentiment surfacing engine 304.

The method flows to operation 1804 where the sentiment surfacing engine aggregates the emotions identified from the interaction data received from the spectators and clusters the emotions into different groups in accordance to the emotions detected from the different spectators. In one implementation, the images of the spectators from the live video are cropped to retain only the facial features and each facial feature and combination of the facial features are analyzed using machine learning algorithm to determine the emotions detected from the spectators. Keywords expressing the emotions are identified from the text content included within the chat content and/or audio content, by the machine learning algorithm. The other interaction data, such as the memes, gifs, emojis, etc., provided via interaction interface are also analyzed in a manner similar to the images of the spectators from the live video, using machine learning algorithm, to identify the emotions. The emotions and emotion related keywords identified from various interactions (images from live video, text, emojis, memes, GIFs, graphics, etc.,) of each spectator are aggregated. The aggregated emotions and emotion related keywords are evaluated to define similarity scores for each emotion. The similarity scores are used to determine the dominant emotions and the spectators providing the emotions and emotion related keywords are then clustered into vibe cliques in accordance to the emotions identified from the interactions of each spectator, such that each group is associated with a distinct emotion. Confidence score for the group (i.e., vibe clique) is computed based on the number of spectators that are expressing the emotions of the group.

The method flows to operation 1806, where the clustering information is used to generate avatar for each group. The avatar for each group expresses the distinct emotion associated with the group. Once a group is formed and the avatar is generated for the group, the expressions of the avatar are adjusted in accordance to changes detected in the emotions of the group. The emotions in the group may change based on the changes occurring in the gameplay of the video game. Changes in the expressions and other interaction data are captured and used to adjust the expression of the avatar of each group. The changes may result in the avatar previously exhibiting negative vibe to begin exhibiting positive vibe or vice versa. Consequently, the features of each avatar is further adjusted to include changes to features, such as color, size, etc., based on the changes in the emotion detected from the spectators in the group and based on the confidence score of the group. In some implementations, the confidence score of the group may change based on spectators leaving the group or new spectators joining the group. As a result, the size of the avatar may dynamically change to reflect the number of spectators expressing the emotion of the group.

The method concludes with operation 1808 where the generated avatars for the different emotions exhibited by the spectators are presented over an image representation of an audience rendered alongside content of the video game. The size of each of the avatars is dynamically scaled in accordance to the confidence score of the respective group associated with the avatar. The scaled avatars provide a visual representation of the emotions of the audience, allowing the spectators to gauge the various emotions and the level of dominance of each emotion of the audience. It allows the spectators to determine how their reaction compares with the reactions of other spectators and to find a group of spectators that align with their emotions. The avatars also allow the gaming players to gauge feedback to specific interactions during gameplay. The various implementations provide a way for a remote spectator to feel the vibes of the crowd and to react to the gameplay that can be shared with other users, allowing them to feel that they are physically together with a group of spectators watching the online gaming. Although the various implementations have been described with reference to spectators viewing online gaming (i.e., gameplay of live video game), the implementations can be extended to include replay of the video game, wherein all the interactions from the spectators viewing the replay may be similarly harvested and used to adjust the expressive avatars of the different groups of spectators viewing the replay.

Figure 19:
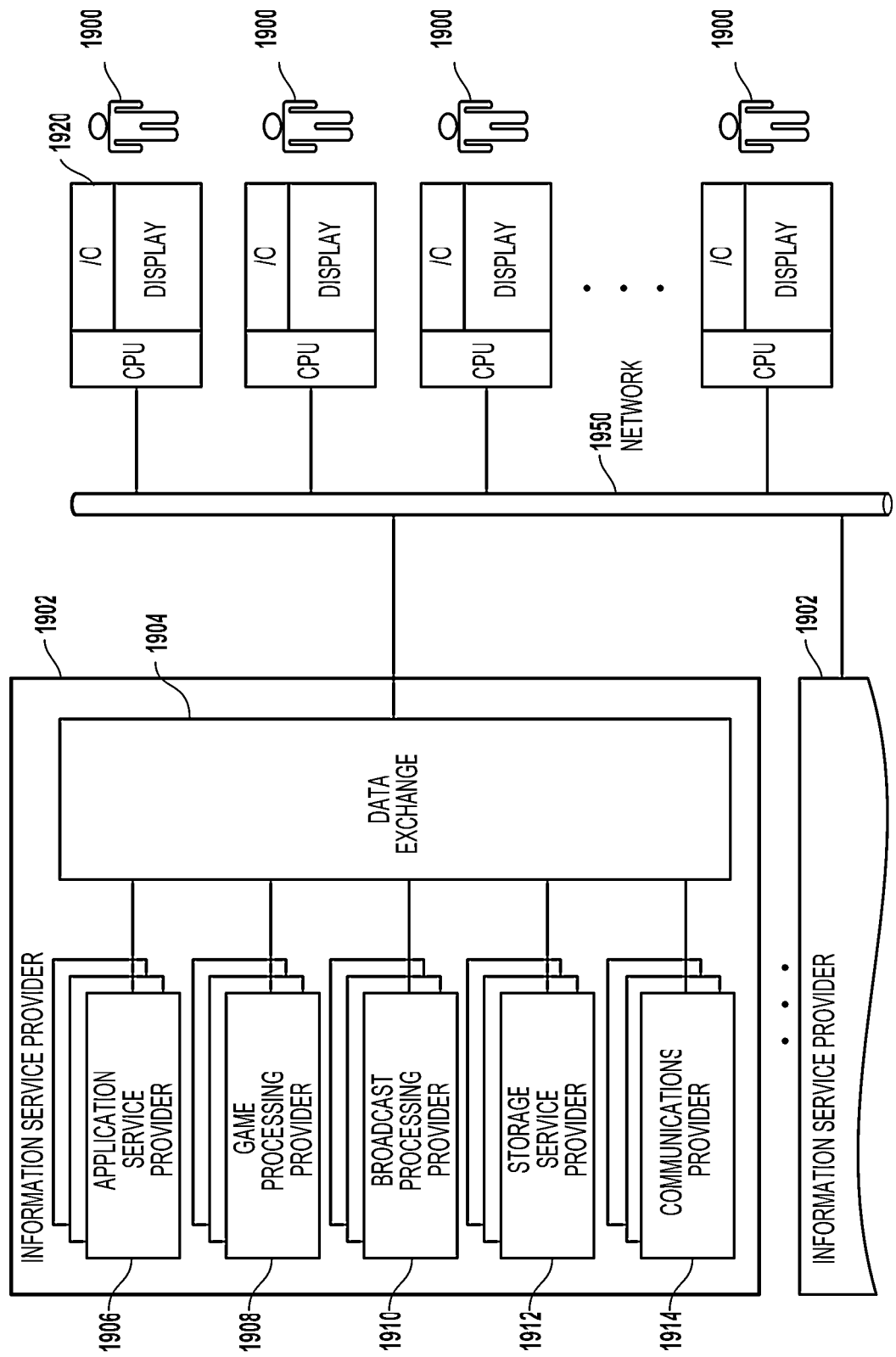
FIG. 19 illustrates an example information service provider used for processing the interaction data of the spectators to present avatars representing different emotions, in accordance with one implementation of the disclosure.

FIG. 19 illustrates an example Information Service Provider architecture that can be used to perform aspects of the various embodiments of the present disclosure, in one implementation. Information Service Providers (ISP) 1902 delivers a multitude of information services to users (i.e., players) 1900 geographically dispersed and connected via network 1950 (also referred by reference number 200 in FIG. 1). An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 1902 includes Application Service Provider (ASP) 1906, which provides computer-based services to customers over a network (e.g. including by way of example without limitation, any wired or wireless network, LAN, WAN, WiFi, broadband, cable, fiber optic, satellite, cellular (e.g. 4G, 5G, etc.), the Internet, etc.). Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1902 includes a Game Processing Server (GPS) 1908 which is used by game clients to play single and multiplayer video games. Most video games played over the Internet operate via a connection to a game server (e.g., game cloud server). Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1910 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1912 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 1914 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1904 interconnects the several modules inside ISP 1902 and connects these modules to users 1900 (players, spectators) via network 1950 (reference number 200 in FIG. 1). Data Exchange 1904 can cover a small area where all the modules of ISP 1902 are in close proximity, or can cover a large geographic area when the different modules are geographically dispersed. For example, Data Exchange 804 can include a fast Gigabit Ethernet (or faster) within a cabinet of a data center, or an intercontinental virtual area network (VLAN).

Users 1900 (players, spectators) access the remote services with client device 1920 (i.e., client device of player 101 or spectator 102 in FIG. 2), which includes at least a CPU, a memory, a display and I/O. The client device can be a PC, a mobile phone, a netbook, tablet, gaming system, a PDA, etc. In one embodiment, ISP 1902 recognizes the type of device used by the client and adjusts the communication method employed. In other cases, client devices use a standard communications method, such as html, to access ISP 1902.

Figure 20:
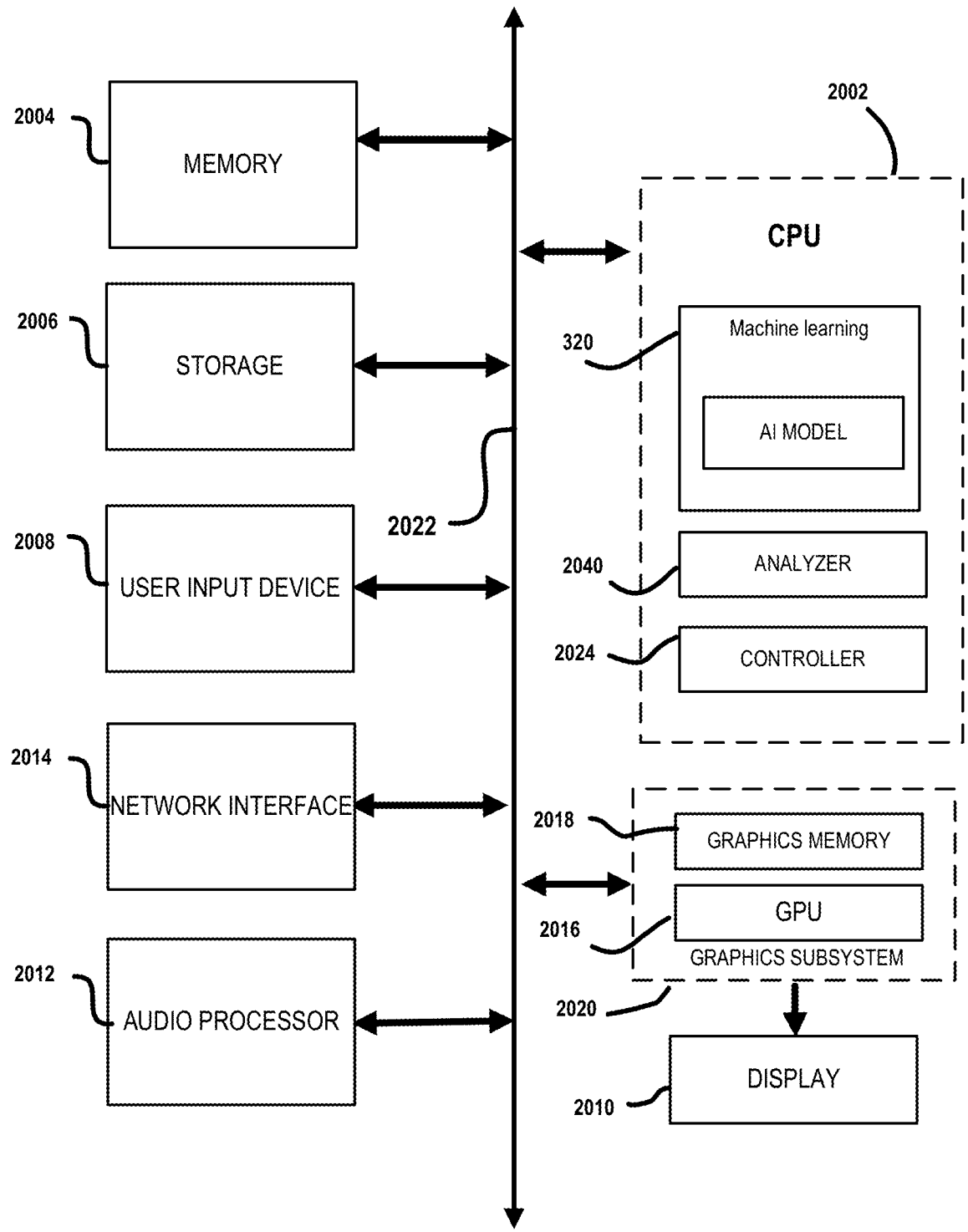
FIG. 20 illustrates components of an example server device that can be used to perform aspects of the various embodiments of the present disclosure.

FIG. 20 illustrates components of an example device 2000 that can be used to perform aspects of the various embodiments of the present disclosure. This block diagram illustrates a device 2000 that can incorporate or can be a personal computer, video game console, personal digital assistant, a server or other digital device, suitable for practicing an embodiment of the disclosure. Device 2000 includes a central processing unit (CPU) 2002 for running software applications and optionally an operating system. CPU 2002 may be comprised of one or more homogeneous or heterogeneous processing cores. For example, CPU 2002 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 2000 may be a localized to a player playing a game segment (e.g., game console), or remote from the player (e.g., back-end server processor), or one of many servers using virtualization in a game cloud system for remote streaming of gameplay to clients.

Memory 2004 stores applications and data for use by the CPU 2002. Storage (e.g., data storage) 2006 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 2008 communicate user inputs from one or more users to device 2000, examples of which may include keyboards, mice, joysticks, touch pads, touch screens, still or video recorders/cameras, tracking devices for recognizing gestures, and/or microphones. Network interface 2014 allows device 2000 to communicate with other computer systems via an electronic communications network, and may include wired or wireless communication over local area networks and wide area networks such as the internet. An audio processor 2012 is adapted to generate analog or digital audio output from instructions and/or data provided by the CPU 2002, memory 2004, and/or storage 2006. The components of device 2000, including CPU 2002, memory 2004, data storage 2006, user input devices 2008, network interface 2014, and audio processor 2012 are connected via one or more data buses 2022.

A graphics subsystem 2020 is further connected with data bus 2022 and the components of the device 2000. The graphics subsystem 2020 includes a graphics processing unit (GPU) 2016 and graphics memory 2018. Graphics memory 2018 includes a display memory (e.g., a frame buffer) used for storing pixel data for each pixel of an output image. Graphics memory 2018 can be integrated in the same device as GPU 2016, connected as a separate device with GPU 2016, and/or implemented within memory 2004. Pixel data can be provided to graphics memory 2018 directly from the CPU 2002. Alternatively, CPU 2002 provides the GPU 2016 with data and/or instructions defining the desired output images, from which the GPU 2016 generates the pixel data of one or more output images. The data and/or instructions defining the desired output images can be stored in memory 2004 and/or graphics memory 2018. In an embodiment, the GPU 2016 includes 3D rendering capabilities for generating pixel data for output images from instructions and data defining the geometry, lighting, shading, texturing, motion, and/or camera parameters for a scene. The GPU 2016 can further include one or more programmable execution units capable of executing shader programs.

The graphics subsystem 2020 periodically outputs pixel data for an image from graphics memory 2018 to be displayed on display device 2010. Display device 2010 can be any device capable of displaying visual information in response to a signal from the device 2000, including CRT, LCD, plasma, and OLED displays. Device 2000 can provide the display device 2010 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, gameplay replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device 2024. However, when such a game is made available via a game cloud system as presented herein, the user may be accessing the video game with a different controller device 2024. For example, a game might have been developed for a game console and its associated controller 2024, whereas the user might be accessing a cloud-based version of the game from a personal computer utilizing a keyboard and mouse. In such a scenario, the input parameter configuration can define a mapping from inputs which can be generated by the user's available controller device 2024 (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device 2024 are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device 2024. That is, the controller device 2024 communicates via a wireless or wired connection with the client device to transmit inputs from the controller device 2024 to the client device. The client device may in turn process these inputs and then transmit input data to the game cloud server via a network (e.g. accessed via a local networking device such as a router). However, in other embodiments, the controller device 2024 can itself be a networked device, with the ability to communicate inputs directly via the network to the game cloud server, without being required to communicate such inputs through the client device first. For example, the controller device 2024 might connect to a local networking device (such as the aforementioned router) to send to and receive data from the game cloud server. Thus, while the client device may still be required to receive video output from the cloud-based video game and render it on a local display, input latency can be reduced by allowing the controller device (also referred to as "controller") 2024 to send inputs directly over the network to the game cloud server, bypassing the client device.

In one embodiment, a networked controller and client device can be configured to send certain types of inputs directly from the controller to the game cloud server, and other types of inputs via the client device. For example, inputs whose detection does not depend on any additional hardware or processing apart from the controller itself can be sent directly from the controller to the game cloud server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the game cloud server. These might include captured video or audio from the game environment that may be processed by the client device before sending to the game cloud server. Additionally, inputs from motion detection hardware of the controller might be processed by the client device in conjunction with captured video to detect the position and motion of the controller, which would subsequently be communicated by the client device to the game cloud server. It should be appreciated that the controller device in accordance with various embodiments may also receive data (e.g. feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method, comprising:

capturing interaction data from spectators in an audience engaged in watching gameplay of a video game;

aggregating the interaction data captured from the spectators in the audience, the aggregation includes clustering the spectators into different groups in accordance to emotions detected from the interaction data of the spectators in the audience, wherein each group of spectators is associated with a distinct emotion and a confidence score that corresponds to a number of spectators in respective group expressing the distinct emotion;

generating an avatar to represent the distinct emotion of each group, wherein expressions of the avatar associated with each group being dynamically adjusted to match changes in expressions of the spectators in the respective group, a size of the avatar representing the distinct emotion scaled based on the confidence score associated with the respective group of spectators; and presenting avatars representing distinct emotions of the different group of spectators in the audience over an image representation of the audience rendered alongside content of the video game, the image representation of the audience with the avatars providing a visual representation of distribution of emotions in the audience, wherein operations of the method are performed by a processor of a game cloud server of a game cloud system.

2. The method of claim 1, wherein aggregating interaction data includes, identifying one or more modal data streams included in the interaction data, processing the one or more modal data streams to identify emotions expressed by the spectators viewing the video game; and clustering the spectators into groups in accordance to the emotions expressed by the spectators, wherein each group of spectators is associated with the distinct emotion, and wherein the one or more modal data streams identified from interaction data correspond to any one or combination of text data, or video data, or audio data, or chat data, or emojis, or memes, or graphic content, graphic interchange format files collected in real time from the spectators viewing gameplay of the video game, the video data captures expressions of the different spectators while the spectators are viewing the video game, and the audio data includes audio content and captures one or more of pitch, or amplitude, or duration.

3. The method of claim 2, further includes, generating and training a plurality of models using machine learning algorithm, wherein each model of the plurality of models is trained using data from a specific one of the modal data streams identified from the interaction data; and aggregating outputs of the plurality of models to classify the emotions and to determine probability of each of the emotions expressed by the spectators via the interaction data.

4. The method of claim 2, further includes, generating and training a model using machine learning algorithm, wherein the model is trained using the modal data streams identified from the interaction data as inputs, outputs of the model are used to classify the emotions and to determine probability of each of the emotions expressed by the spectators via the interaction data.

5. The method of claim 1, wherein the confidence score associated with each group of spectators varies in accordance to changes in number of spectators detected in the respective group of spectators and the size of the avatar representing the respective group of spectators adjusted in accordance to changes in the confidence score of respective group of spectators.

6. The method of claim 1, wherein aggregating the interaction data includes generating and dynamically updating a word cloud with keywords identified via sentiment analysis of select ones of the interaction data, the keywords in the word cloud capture an emotional state of the audience at each point in time, the keywords from the word cloud used as inputs by machine learning algorithm to generate and train one or more models, outputs from the one or more models used to identify the emotions and probability of each of the emotions expressed by the spectators via the interaction data.

7. The method of claim 1, wherein the expressions of the spectators in each group change in accordance with changes occurring in the gameplay of the video game and the expressions of each avatar associated with the respective group are dynamically adjusted to reflect the changes detected in the expressions of the spectators of the respective group of spectators.

8. The method of claim 1, further includes, generating and presenting an interactive temporal graph representing reaction intensities of different emotions detected from different groups of spectators in the video game, reaction intensity of each of the different emotions in the interactive temporal graph varying over time in accordance to changes occurring in the gameplay of the video game, wherein changes in the reaction intensities captured in the interactive temporal graph linked to particular portions of gameplay of the video game that caused changes in the reaction intensities of the different emotions detected from the respective groups of spectators, wherein linking allows access to the particular portions of the gameplay of the video game to view interactions that caused corresponding changes in the reaction intensities.

9. The method of claim 8, wherein the interactive temporal graph is a line graph with a plurality of graph lines, wherein each graph line corresponds to a particular emotion detected from a specific group of spectators, the avatar corresponding to the particular emotion rendered over a respective graph line.

10. The method of claim 1, wherein gameplay of the video game is streamed in real-time and a recording of the gameplay is stored in a gameplay datastore and made available for subsequent streaming at delayed time, and wherein an interactive temporal graph representing reaction intensities of emotions associated with groups of spectators of the video game is generated and presented with the content of the video game, the interactive temporal graph is generated in real-time and is stored with the recording of the gameplay in the gameplay datastore, and wherein when the recording of the gameplay is streamed subsequently at delayed time, a new interactive temporal graph is generated by modifying the interactive temporal graph to include reaction intensities of a plurality of spectators captured when the recording of the gameplay is streamed during delayed time, the new interactive temporal graph capturing reaction intensities of the plurality of spectators is presented with the content of the video game during rendition of the recording of the gameplay at the delayed time.

11. The method of claim 1, wherein presenting avatars includes providing a user interface with a segmenting option and a formatting option for selection by spectators, the segmenting option providing options for selecting a segment from a plurality of segments defined on a display screen for rendering the avatars and the formatting option providing rendering options to adopt when rendering the avatar on the display screen, and wherein the formatting options includes any one of a transparency format, or an overlay format, or a presentation format.

12. The method of claim 1, wherein presenting the avatar includes, determining geo location of spectators in each group of spectators;

when the spectators in each group are associated with a single geo location and each group of spectators is associated with a distinctly different geo location, presenting a map including the geo locations associated with each group of spectators; and overlaying a corresponding avatar associated with the respective group of spectators over the geo location associated with the respective group of spectators identified in the map.

13. The method of claim 1, further includes, identifying a specific spectator in each group;

capturing reactions of the specific spectator in each group during defining game moments; and rendering the reactions of the specific spectator captured during defining game moments alongside the content of the video game.

14. The method of claim 13, wherein identifying the specific spectator in each group includes, identifying an action that is scheduled to occur in the video game, the action identified based on game state of the video game;

identifying types of reactions exhibited by different ones of spectators for different actions occurring in the video game, using machine learning algorithm; and selecting the specific spectator in each group based on the reactions exhibited by the specific spectator to the different actions, the selecting of the specific spectator includes predictively zooming in to capture the reactions of the specific one of the spectators in each group when the action occurs in the video game.

15. The method of claim 13, wherein the specific spectator in each group is selected based on type and number of comments related to expressions of the specific spectator of each group generated by remaining spectators in the respective group, or randomly, or is selected based on expressive reactions provided by the specific spectator.

16. The method of claim 1, wherein interaction data captured from the spectators include reactions to an event or an action occurring in the video game, or counter-reactions to reactions of a particular spectator viewing gameplay of the video game.

17. The method of claim 16, wherein interaction data captured from the spectators of a group includes the reactions of the particular spectator associated with the group, and wherein aggregating the interaction data captured from the spectators includes aggregating reactions of other spectators in the group that are reacting to the reactions of the particular spectator.

18. The method of claim 1, wherein clustering the spectators into different groups further includes providing an option for a spectator to move from a first cluster to a second cluster, the option being provided on a user interface rendered alongside content of the video game, the move resulting in dynamically disassociating the spectator from the first cluster and dynamic associating the spectator to the second cluster, wherein the dynamic associating allows the spectator to have access to the interactions of the spectators in the second cluster and the dynamic disassociating prevents the spectator from accessing the interactions of the spectators in the first cluster.

19. A method, comprising:

capturing interaction data from spectators in an audience engaged in watching gameplay of a video game;

aggregating the interaction data captured from the spectators in the audience by performing sentiment analysis of the interaction data, the aggregation includes, identifying one or more modal data streams included in the interaction data;

processing the one or more modal data streams to identify emotions expressed by the spectators viewing gameplay of the video game;

clustering the spectators into groups in accordance to the emotions expressed by the spectators, wherein each group of spectators is associated with a distinct emotion and a confidence score that corresponds to a number of spectators in the respective group expressing the distinct emotion;

generating an avatar to represent the distinct emotion of each group, wherein expressions of the avatar associated with each group being dynamically adjusted to match changes in the expressions of the spectators of the respective group, a size of the avatar representing the distinct emotion of each group scaled based on the confidence score associated with the respective group of spectators; and presenting avatars representing distinct emotions of different group of spectators in the audience over an image representation of the audience rendered alongside content of the video game, the image representation of the audience with the avatars providing a visual representation of distribution of emotions expressed by the spectators in the audience, wherein operations of the method are performed by a processor of a game cloud server of a game cloud system.

20. The method of claim 19, wherein the identifying and processing of the one or more modal data streams included in the interaction data is performed using machine learning algorithm.

* * * * *